(12) United States Patent
Cao et al.

(10) Patent No.: US 12,556,287 B2
(45) Date of Patent: Feb. 17, 2026

(54) OPTICAL RECEIVING APPARATUS, OPTICAL RECEIVING PACKAGING APPARATUS, AND RELATED DEVICE AND METHOD

(71) Applicant: HUAWEI TECHNOLOGIES CO., LTD., Shenzhen (CN)

(72) Inventors: Rixiang Cao, Dongguan (CN); Zhichao Nong, Shenzhen (CN); Jinhua Ye, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 301 days.

(21) Appl. No.: 18/452,759

(22) Filed: Aug. 21, 2023

(65) Prior Publication Data

US 2023/0396342 A1    Dec. 7, 2023

Related U.S. Application Data

(63) Continuation of application No. PCT/CN2022/071917, filed on Jan. 14, 2022.

(30) Foreign Application Priority Data

Feb. 27, 2021   (CN) .......................... 202110221354.9

(51) Int. Cl.
*H04B 10/69*    (2013.01)
*H04B 10/2575*    (2013.01)

(52) U.S. Cl.
CPC ....... *H04B 10/69* (2013.01); *H04B 10/25759* (2013.01)

(58) Field of Classification Search
CPC .................. H04B 10/69; H04B 10/25759
(Continued)

(56) References Cited

U.S. PATENT DOCUMENTS 10,020,784 B1 *   7/2018   Christensen ............ H03F 1/083
10,931,381 B2 *   2/2021   Vera Villarroel ... H03F 3/45973
(Continued)

FOREIGN PATENT DOCUMENTS

CN           109743113 B  * 10/2021
WO    WO-2017221880 A1 * 12/2017    ........... H04B 10/616

OTHER PUBLICATIONS

Deng et al; Design of an auto-gain control transimpedance amplifier for optical sensing applications; Aug. 2016, IEEE, pp. 1-5. (Year: 2016).*

*Primary Examiner* — Amritbir K Sandhu
(74) *Attorney, Agent, or Firm* — HAUPTMAN HAM, LLP

(57) ABSTRACT

An optical receiving apparatus includes a decoupler, a voltage regulator, an optical-to-electrical converter, and an amplifier. The decoupler receives a first electrical signal, and performs direct current removal processing on the first electrical signal thereby obtaining a second electrical signal. The first electrical signal includes control information to control a working state of the amplifier. The electrical signal is a pulse signal and includes the control information. The voltage regulator receives the first electrical signal, and performs voltage regulation processing on the first electrical signal thereby obtaining a third electrical signal that has a constant amplitude and provides a voltage for the amplifier. The optical-to-electrical converter receives a burst optical signal, and converts the burst optical signal into a fourth electrical signal. The amplifier amplifies the fourth electrical signal based on the control information and a power supply of the third electrical signal, and outputs an amplified fourth electrical signal.

19 Claims, 8 Drawing Sheets

(58) Field of Classification Search
USPC .......................................................... 398/202
See application file for complete search history.

(56) References Cited

U.S. PATENT DOCUMENTS

| | | | | |
|---|---|---|---|---|
| 12,191,915 | B1* | 1/2025 | Lakshmikumar | .... H04B 10/616 |
| 2019/0173588 | A1* | 6/2019 | Ahmed | ................ H04B 10/693 |
| 2020/0091881 | A1* | 3/2020 | Lim | .................... H03F 3/45475 |
| 2021/0167863 | A1* | 6/2021 | Sugimoto | ........... H03F 3/45475 |
| 2023/0084591 | A1* | 3/2023 | Micusik | ............. H04B 10/6933 |
| | | | | 398/115 |

* cited by examiner

OPTICAL RECEIVING APPARATUS, OPTICAL RECEIVING PACKAGING APPARATUS, AND RELATED DEVICE AND METHOD

CROSS-REFERENCE TO RELATED APPLICATIONS

This application is a continuation of International Application No. PCT/CN2022/071917, filed on Jan. 14, 2022, which claims priority to Chinese Patent Application No. 202110221354.9, filed on Feb. 27, 2021, the disclosures of the aforementioned applications are hereby incorporated by reference in their entireties.

TECHNICAL FIELD

This application relates to the field of optical communication technologies, and in particular, to an optical receiving apparatus, an optical receiving packaging apparatus, and a related device and method.

BACKGROUND

In a passive optical network (PON) system, an optical line terminal (OLT) may establish a communication connection with a plurality of optical network units (ONUs) in the PON system via an optical splitter (optical splitter). During downlink data transmission, the OLT may transmit data to each ONU in a broadcast manner. During uplink data transmission, the ONU transmits the data to the OLT in a time division multiplexing manner. During the uplink data transmission, different ONUs send uplink data to the OLT in different slots. A communication signal sent by the ONU to the OLT in one slot is referred to as a burst optical signal. In an ideal case, for the burst optical signal from any ONU, a burst optical receiver in the OLT should be capable of quickly responding to the burst optical signal and recovering transmission information from the burst optical signal.

The optical receiver includes an amplifier module, which may be configured to amplify an electrical signal obtained by the optical receiver through optical-to-electrical conversion. When the amplifier module is used in the optical receiver of the PON system, a reset (reset) signal needs to be used to trigger the amplifier module to enter a capability of quickly responding to a signal, for example, quickly adjusting a direct current bias and a gain state. In addition, the PON system usually supports coexistence of a plurality of data transmission rates. For example, in a 10G PON system, the burst optical signal arriving at the OLT may have a plurality of rates such as 1.25 Gbps, 2.5 Gbps, and 10 Gbps. Therefore, a rate select (rate select) signal (which is referred to as a rate indication signal, or the like) needs to be used to assist the optical receiver in selecting and supporting different rates.

In some approaches, a most widely used packaging form of the optical receiver is a 5-pin (five pins) TO CAN (transistor outline can) packaging form that may have better packaging costs. The optical receiver obtained in the packaging form may have five signal pins that are respectively used for inputting a VCC signal, inputting a VPD signal, grounding, and differentially outputting an electrical signal obtained by the optical receiver. However, the optical receiver in the PON system additionally needs a reset signal and the rate select signal. Therefore, two signal pins need to be added on the basis of the five signal pins. The two signal pins are respectively used for receiving the reset signal and the rate select signal. This undoubtedly increases the packaging costs of the optical receiver in the PON system.

SUMMARY

One or more embodiments of the present application provide an optical receiving apparatus, an optical receiving packaging apparatus, and a related device and method. According to One or more embodiments of the present application, a requirement for a signal pin of an optical receiver in a PON system can be reduced, thereby reducing packaging costs of the optical receiver.

According to a first aspect, an embodiment of this application provides an optical receiving apparatus, configured to receive and process a burst optical signal. The optical receiving apparatus may be a receiver optical sub-assembly (or a part of the receiver optical sub-assembly), or may be a part of a bi-directional optical sub-assembly. The optical receiving apparatus includes a decoupling module, a voltage regulator module, an optical-to-electrical conversion module, and an amplifier module.

In some embodiments, the decoupling module is configured to receive a first electrical signal, and perform direct current removal processing on the first electrical signal to obtain a second electrical signal. The first electrical signal carries control information. The second electrical signal is a pulse signal and carries the control information. The control information is used to control a working state of the amplifier module.

In some embodiments, the voltage regulator module is configured to receive the first electrical signal, and perform voltage regulation processing on the first electrical signal to obtain a third electrical signal. The third electrical signal is a signal with a constant amplitude and is used to provide a stable working voltage for the amplifier module.

In some embodiments, the optical-to-electrical conversion module is configured to receive the burst optical signal, and convert the received burst optical signal into a fourth electrical signal.

In some embodiments, the amplifier module is configured to amplify the fourth electrical signal under control of the control information in the second electrical signal and power supply of the third electrical signal, and output the amplified fourth electrical signal.

In some embodiments, the control information may be coupled with a signal that supplies power to the amplifier module as the first electrical signal, and then the first electrical signal is input to the optical receiving apparatus. This reduces a quantity of signal pins of the optical receiving apparatus. In addition, in the optical receiving apparatus, the first electrical signal may pass through the decoupling module and the voltage regulator module, to implement decoupling of the control information and the power supply signal, so that the decoupled control information and power supply signal respectively function normally in the optical receiving apparatus. This ensures that under control of the control information and power supply of the power supply signal, the optical receiving apparatus normally recovers information in the burst optical signal.

In some embodiments, the control information may include reset information and/or rate selection information. The reset information is used to control the amplifier module to enter a burst optical signal receiving state. The amplifier module includes signal receiving working modes respectively corresponding to N different receiving rates, where N is a positive integer. The rate selection information is used to control the amplifier module to be in a signal receiving working mode corresponding to a first receiving rate, where the first receiving rate is one of the N different receiving rates.

In some embodiments, the control information includes the reset information and the rate selection information. The optical receiving apparatus further includes a separation module, configured to: under power supply of the third electrical signal, separately extract the reset information and the rate selection information from the second electrical signal, and separately transmit the reset information and the rate selection information to the amplifier module. For example, the reset information may be indicated by each pulse in the second electrical signal. The rate selection information may be indicated by a pulse amplitude and a pulse width of a pulse in the second electrical signal, a quantity of pulses in a group of continuous pulses, or the like.

In some embodiments, the separation module is specifically configured to perform pulse detection on the second electrical signal to obtain the reset information, perform peak detection on the second electrical signal, and obtain the rate selection information based on a detected signal peak. For example, the rate selection information is indicated by the pulse amplitude of the pulse in the second electrical signal, and corresponding rate selection information may be obtained through peak detection on the second electrical signal.

Further, for example, the separation module may include a first pulse detection unit, a first peak detection unit, N first comparison units, and a first logic operation unit.

The first pulse detection unit is configured to perform pulse detection on the second electrical signal, and, output a pulse signal of one clock cycle when detecting the pulse signal. The pulse signal output by the first pulse detection unit is used to trigger the amplifier module to enter a burst signal receiving state.

The first peak detection unit is configured to perform peak detection on the second electrical signal, and output a detected first peak signal.

Each first comparison unit in the N first comparison units is configured to compare a magnitude of a received first reference signal with a magnitude of the first peak signal, and output a first comparison result level. First reference signals received by the N first comparison units are different.

The first logic operation unit is configured to perform a logic operation based on the first comparison result levels output by the N first comparison units, and output rate indicator bit levels respectively corresponding to the N receiving rates. In the rate indicator bit levels respectively corresponding to the N receiving rates, only a rate indicator bit level corresponding to the first receiving rate is a first level. The first level is used to control the amplifier module to be in the signal receiving working mode corresponding to the first receiving rate.

In some embodiments, the separation module is specifically configured to perform pulse detection on the second electrical signal to obtain the reset information, perform the peak duration detection on the second electrical signal, and obtain the rate selection information based on the detected peak duration. For example, the rate selection information is indicated by the pulse width in the second electrical signal, and corresponding rate selection information may be obtained through the peak duration detection on the second electrical signal.

Further, for example, the separation module includes a second pulse detection unit, a second peak detection unit, a second comparison unit, N signal delay units, N second logic operation units, and a third logic operation unit.

The second pulse detection unit is configured to perform the pulse detection on the second electrical signal, and output the pulse signal of one clock cycle when detecting the pulse signal. The pulse signal output by the second pulse detection unit is used to trigger the amplifier module to enter the burst signal receiving state.

The second peak detection unit is configured to perform the peak detection on the second electrical signal, and output a detected second peak signal. Peak duration of the second peak signal is positively correlated with the pulse width of the second electrical signal.

The second comparison unit is configured to compare a magnitude of a received second reference signal with a magnitude of the second peak signal, and output a second comparison result level.

Each delay unit in the N signal delay units is configured to delay the second comparison result level to obtain a first delay signal. Delay duration of the N signal delay units for the second comparison result level is different.

One signal delay unit is connected to one second logic operation unit. The second logic operation unit is configured to perform a logic AND operation on the received first delay signal and the second comparison result level to obtain an operation result indication level.

The third logic operation unit is configured to perform a logic operation based on the operation result indication levels output by the N second logic operation units, and output rate indicator bit levels respectively corresponding to the N receiving rates. In the rate indicator bit levels respectively corresponding to the N receiving rates, only the rate indicator bit level corresponding to the first receiving rate is a second level. The second level is used to control the amplifier module to be in the signal receiving working mode corresponding to the first receiving rate.

In some embodiments, the separation module is specifically configured to perform the pulse detection on the second electrical signal, obtain a plurality of pieces of reset information based on a plurality of detected pulse signals, and obtain the rate selection information based on a quantity of pulses detected within a detection periodicity. For example, the rate selection information is indicated by a quantity of pulses in a group of continuous pulses in the second electrical signal. Corresponding quantity selection information may be obtained by detecting the quantity of pulses detected in the second electrical signal within the detection periodicity.

Further, for example, the separation module includes a third pulse detection unit and a polling triggering unit.

The third pulse detection unit is configured to perform the pulse detection on the second electrical signal, and output the pulse signal of one clock cycle when detecting the pulse signal. The pulse signal output by the third pulse detection unit is used to trigger the amplifier module to enter the burst signal receiving state.

The polling triggering unit is configured to detect the pulse signal within the detection periodicity, under triggering of any pulse signal detected within the detection periodicity, determine the first receiving rate from the N receiving rates based on a first rate polling sequence, and set the rate indicator bit level corresponding to the first receiving rate to a third level. The polling triggering unit is further configured to output the rate indicator bit levels respectively corresponding to the N receiving rates. In the rate indicator bit levels respectively corresponding to the N receiving rates, only the rate indicator bit level corresponding to the first receiving rate is the third level. The third level is used to control the amplifier module to be in the signal receiving working mode corresponding to the first receiving rate.

In some embodiments, the control information includes one of the reset information or the rate selection information. The optical receiving apparatus further includes an extraction module, configured to: under power supply of the third electrical signal, extract the control information from the second electrical signal, and transmit the control information to the amplifier module.

Further, if the control information includes the reset information, the extraction module is specifically configured to perform the pulse detection on the second electrical signal to obtain the reset information.

Further, if the control information includes the rate selection information, the extraction module is specifically configured to perform the peak detection on the second electrical signal, and obtain the rate selection information based on the detected signal peak. For example, the rate selection information is indicated by the pulse amplitude of the pulse in the second electrical signal, and the corresponding rate selection information may be obtained through the peak detection on the second electrical signal.

Further, if the control information includes the rate selection information, the extraction module is specifically configured to perform the peak duration detection on the second electrical signal, and obtain the rate selection information based on the detected peak duration. For example, the rate selection information is indicated by the pulse width in the second electrical signal, and the corresponding rate selection information may be obtained through the peak duration detection on the second electrical signal.

Further, if the control information includes the rate selection information, the extraction module is specifically configured to perform the peak detection on the second electrical signal, and obtain the rate selection information based on the quantity of pulses detected within the detection periodicity. For example, the rate selection information is indicated by the quantity of pulses in the group of continuous pulses in the second electrical signal. The corresponding quantity selection information may be obtained by detecting the quantity of pulses detected in the second electrical signal within the detection periodicity.

According to a second aspect, an embodiment of this application provides an optical receiving packaging apparatus. The apparatus includes at least five signal pins, a photoelectric detector, and a trans-impedance amplifier. The five signal pins include a first signal pin, a second signal pin, a third signal pin, a fourth signal pin, and a fifth signal pin.

The first signal pin is used for inputting a first electrical signal. The first electrical signal carries control information. The control information is used to control a working state of the trans-impedance amplifier.

The second signal pin is used for inputting a fifth electrical signal. The fifth signal pin is used for grounding.

The photoelectric detector is configured to convert a received burst optical signal into a fourth electrical signal under power supply of the fifth electrical signal.

The trans-impedance amplifier is configured to receive the first electrical signal, perform direct current filtering processing on the first electrical signal to obtain a second electrical signal, and perform voltage regulation processing on the first electrical signal to obtain a third electrical signal. The second electrical signal carries the control information. The trans-impedance amplifier is further configured to: amplify the fourth electrical signal under control of the control information in the second electrical signal and power supply of the third electrical signal, to obtain the amplified fourth electrical signal.

The third signal pin and the fourth signal pin are used for differentially outputting the fourth electrical signal amplified by the trans-impedance amplifier.

The optical receiving packaging apparatus may be packaged based on different packaging forms. For example, the optical receiving packaging apparatus may be packaged based on any TO-CAN coaxial packaging form, a butterfly-shaped packaging form, a COB (chip on board) packaging form, a BOX (box-shaped) packaging form, or the like.

The control information may be coupled with a signal that supplies power to the trans-impedance amplifier as the first electrical signal, and then the first electrical signal is input to the optical receiving packaging apparatus via the first signal pin. This reduces a quantity of signal pins of the optical receiving packaging apparatus. In addition, in the optical receiving packaging apparatus, the first electrical signal may pass through the trans-impedance amplifier, to implement decoupling of the control information and the power supply signal, so that the decoupled control information and power supply signal respectively function normally in the trans-impedance amplifier. This ensures that under control of the control information and power supply of the power supply signal, the optical receiving packaging apparatus normally recovers information in the burst optical signal.

In some embodiments, the control information may include reset information and/or rate selection information. The reset information is used to control the trans-impedance amplifier to enter a burst signal receiving state. The trans-impedance amplifier includes signal receiving working modes respectively corresponding to N different receiving rates, where N is a positive integer. The rate selection information is used to control the trans-impedance amplifier to be in a signal receiving working mode corresponding to a first receiving rate. The first receiving rate is one of the N different receiving rates.

According to a third aspect, an embodiment of this application provides an optical receiving device, including an optical receiving apparatus and a signal coupling apparatus.

The signal coupling apparatus is configured to receive a sixth electrical signal and a seventh electrical signal, couple the sixth electrical signal and the seventh electrical signal, and output a first electrical signal. The sixth electrical signal is used to supply power to the optical receiving device, and the seventh electrical signal carries control information. The control information is used to control a working state of the optical receiving apparatus.

The optical receiving apparatus is configured to receive the first electrical signal, perform direct current removal processing on the first electrical signal to obtain a second electrical signal, and perform voltage regulation processing on the first electrical signal to obtain a third electrical signal. The optical receiving apparatus is further configured to receive a burst optical signal and a fifth electrical signal, under power supply of the fifth electrical signal, convert the received burst optical signal into a fourth electrical signal, and under control of the second electrical signal and power supply of the third electrical signal, amplify and output the fourth electrical signal. The optical receiving apparatus may be the apparatus according to the first aspect or any alternative implementation of the first aspect of embodiments of this application, or the apparatus according to the second aspect or any alternative implementation of the second aspect of embodiments of this application.

In some embodiments, the control information may include reset information and/or rate selection information. The reset information is used to control the optical receiving apparatus to enter a burst signal receiving state. The optical receiving apparatus includes signal receiving working modes respectively corresponding to N different receiving rates, where N is a positive integer. The rate selection information is used to control the optical receiving apparatus to be in a signal receiving working mode corresponding to a first receiving rate. The first receiving rate is one of the N different receiving rates.

According to a fourth aspect, an embodiment of this application provides an optical signal processing method. The method may be applied to an optical receiving apparatus for receiving and processing a burst optical signal. In the method, the optical receiving apparatus may receive a first electrical signal, and perform direct current removal processing on the first electrical signal to obtain a second electrical signal. The first electrical signal carries control information. The second electrical signal is a pulse signal and carries the control information. The control information is used to control a working state of the optical receiving apparatus. Voltage regulation processing on the first electrical signal is performed to obtain a third electrical signal. The third electrical signal is a signal with a constant amplitude. The burst optical signal and a fifth electrical signal are received. Under power supply of the fifth electrical signal, the received burst optical signal is converted into a fourth electrical signal. The fourth electrical signal is amplified based on the second electrical signal and a third electrical signal, and the amplified fourth electrical signal is output.

In some embodiments, the control information may include reset information and/or rate selection information. The reset information is used to control the optical receiving apparatus to enter the burst signal receiving state. The optical receiving apparatus includes signal receiving working modes respectively corresponding to N different receiving rates, where N is a positive integer. The rate selection information is used to control the optical receiving apparatus to be in a signal receiving working mode corresponding to a first receiving rate. The first receiving rate is one of the N different receiving rates.

According to a fifth aspect, an embodiment of this application provides another optical signal receiving method. The method may be applied to an optical communication device. The optical communication device includes an optical receiving apparatus. In the method, the optical communication device may receive a sixth electrical signal and a seventh electrical signal, and couple the sixth electrical signal and the seventh electrical signal to obtain a first electrical signal. The sixth electrical signal is used to supply power to the optical communication device, and the seventh electrical signal carries control information. The control information is used to control a working state of the optical receiving apparatus. Then, the first electrical signal is input to the optical receiving apparatus, and is used by the optical receiving apparatus to perform the method provided in the fourth aspect of embodiments of this application.

In some embodiments, the control information may include reset information and/or rate selection information. The reset information is used to control the optical receiving apparatus to enter a burst signal receiving state. The optical receiving apparatus includes signal receiving working modes respectively corresponding to N different receiving rates, where N is a positive integer. The rate selection information is used to control the optical receiving apparatus to be in a signal receiving working mode corresponding to a first receiving rate. The first receiving rate is one of the N different receiving rates.

According to a sixth aspect, an embodiment of this application provides a chip. The chip includes a processor and a communication interface. The processor is coupled to the communication interface for implementing all or some functions of the optical receiving apparatus provided in embodiments of this application, implementing all or some functions of the optical receiving packaging apparatus in embodiments of this application, or implementing the optical signal processing method provided in embodiments of this application.

BRIEF DESCRIPTION OF DRAWINGS

To describe the technical solutions in embodiments of this application more clearly, the following briefly describes the accompanying drawings for embodiments. It is clear that the accompanying drawings in the following description show merely some embodiments of this application, and a person of ordinary skill in the art may derive other drawings from these accompanying drawings without creative efforts.

DETAILED DESCRIPTION

The following clearly describes the technical solutions in one or more embodiments of this application with reference to the accompanying drawings in embodiments of this application. It is clear that the described embodiments are some but not all of embodiments of this application. All other embodiments obtained by a person of ordinary skill in the art based on embodiments of this application without creative efforts shall fall within the protection scope of this application.

Figure 1:
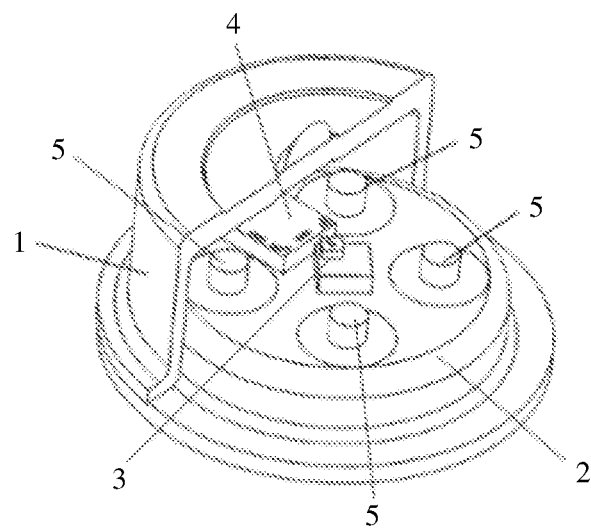
FIG. 1 is a schematic diagram of a structure of an optical receiver packaged in a 5-pin TO CAN form according to an embodiment of this application.

Before an optical receiving apparatus, an optical receiving packaging apparatus, and a related device and method provided in this application are described, an optical receiver packaged in a 5-pin TO CAN form is briefly described first, referring to FIG. 1. FIG. 1 is a schematic diagram of a structure of the optical receiver packaged in the 5-pin TO CAN form according to an embodiment of this application. As shown in FIG. 1, the optical receiver 1 includes a pipe cap 1 having protection and sealing functions, a base 2 having a fixed and bearing function, a photodiode (PD) 3 carried on the base 2, a trans-impedance amplifier (TIA) 4, a plurality of signal pins 5, and electrical elements such as a capacitor, a resistor, and an inductor that are used to drive the optical receiver 1 for normal operation, filtering and the like. The photodiode 3 may be configured to receive a burst optical signal, and perform optical-to-electrical conversion on the burst optical signal. The trans-impedance amplifier 4 may be configured to amplify an electrical signal obtained by performing optical-to-electrical conversion on the photodiode 3. There may be five signal pins 5 (where four signal pins are shown from the perspective in FIG. 1), which may be respectively used for inputting a power supply signal of the photodiode 3, inputting a power supply signal of the trans-impedance amplifier 4, grounding, and differentially outputting an electric signal amplified by the trans-impedance amplifier 4. The signal pin 5 may be connected to signal electrodes on the photodiode 3 and the trans-impedance amplifier 4 by using gold wires, and the like, to transmit the electrical signal obtained through the optical-to-electrical conversion.

Usually, the signal pin 5 and a bottom of the base 2 are electrically isolated, for example, may be isolated by using glass cement or another insulating material. The entire bottom may serve as a ground plane and is connected to an external ground via a special signal pin connected to the bottom. The external ground can be understood as a plane with an equal electric potential, such as the earth, or a conductor connected to the earth. Elements on the base 2 may alternatively be connected through welding.

The optical receiver shown in FIG. 1 may be used in a scenario in which a reset signal and a rate select signal do not need to be input. However, when the reset signal and the rate select signal need to be used in a PON system, the optical receiver with five signal pins shown in FIG. 1 cannot meet this requirement.

According to the optical receiving apparatus, the optical receiving packaging apparatus, and the related device and method provided in embodiments of this application, a requirement for the signal pin of the optical receiver in the PON system can be reduced by multiplexing the signal pin, thereby reducing packaging costs of the optical receiver. An application scenario of a related apparatus, device, and method in embodiments of this application are described first.

The related apparatus, device, and method provided in embodiments of this application may be applied to a scenario in which data is transmitted via an optical signal, for example, in the PON system or an OTN (optical transport network) system. The optical receiver of an OLT in the PON system is used as an example for describing the application scenario of the related apparatus, device, and method in embodiments of this application.

With the development of optical communication technologies, a plurality of different PON systems have evolved and developed, for example, a next-generation PON (NG-PON), an NG-PON 1, an NG-PON 2, a gigabit-capable PON (GPON), a 10-gigabit per second PON (10-gigabit per second PON, XG-PON), a 10-gigabit-capable symmetric passive optical network (10-gigabit-capable symmetric passive optical network, XGS-PON), an Ethernet PON (EPON), 10-gigabit per second EPON (10-gigabit per second EPON, 10G-EPON), a next-generation EPON (NG-EPON), a wavelength-division multiplexing (WDM) PON, a time- and wavelength-division multiplexing (TWDM) PON, a point-to-point (P2P) WDM PON (P2P-WDM PON), an asynchronous transfer mode PON (APON), a broadband PON (BPON), a 25-gigabit per second PON (25G-PON), a 50-gigabit per second PON (50G-PON), a 100-gigabit per second PON (100G-PON), a 25-gigabit per second EPON (25G-EPON), a 50-gigabit per second EPON (50G-EPON), a 100-gigabit per second EPON (100G-EPON), and GPON, EPON, and the like of another rate.

Figure 2:
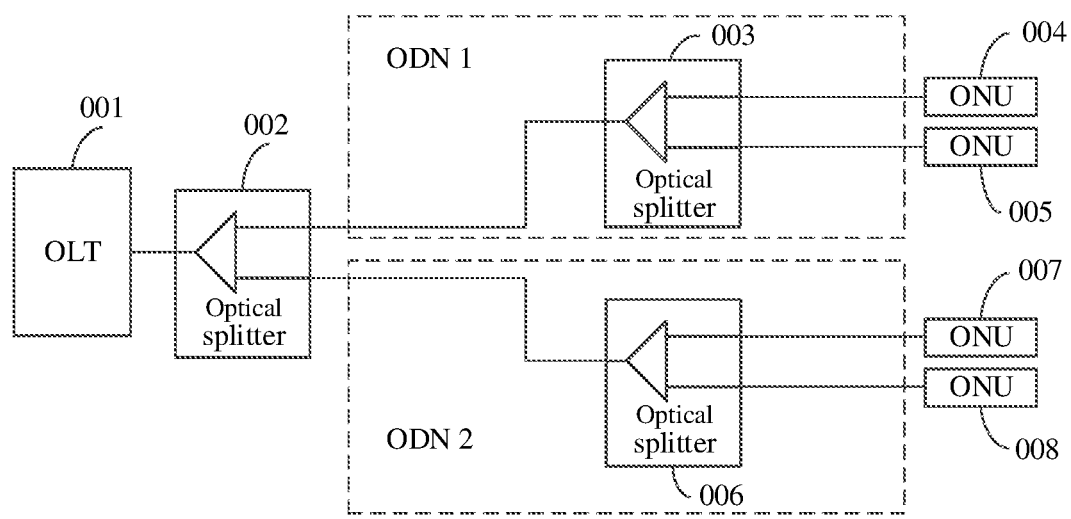
FIG. 2 is a schematic diagram of a PON system according to an embodiment of this application.

Refer to FIG. 2. FIG. 2 is a schematic diagram of a PON system according to an embodiment of this application. The PON system shown in FIG. 2 may include an OLT 001, an optical splitter 002, an optical splitter 003, an ONU 004, an ONU 005, an optical splitter 006, an ONU 007, and an ONU 008. The OLT 001 separately establishes communication connections with the ONU 004, the ONU 005, the ONU 007, and the ONU 008 that are on a user side.

In an aspect, the ONU 004, the ONU 005, the ONU 007, and the ONU 008 each may transmit a burst optical signal to the OLT 001 in different slots. After the burst optical signal arrives at the OLT 001, the OLT 001 needs specific burst recovery time to stably recover information in the burst optical signal. In other words, the PON system needs to reserve a specific time overhead for an optical receiver to recover the information in the burst optical signal. The time overhead is ineffective transmission for the PON system. In other words, within the time overhead, the OLT 001 needs to recover information in a received burst optical signal. However, effective data cannot be transmitted within the time overhead. Therefore, the PON system with a smaller time overhead has higher efficiency in effective information transmission. A reset signal may trigger the optical receiver to enter a burst signal receiving state in which the information in the burst optical signal may be quickly recovered. For example, when the optical receiver does not enter the burst signal receiving state, a trans-impedance amplifier in the optical receiver usually responds slowly to adjustment of a direct current bias and a gain state for a long string of continuous 0 signals or 1 signals, to ensure that a signal is not amplified and distorted. However, after the optical receiver of the PON system enters the burst signal receiving state, the trans-impedance amplifier in the optical receiver may quickly adjust, after the reset signal is triggered, the direct current bias and the gain state of the burst optical signal having different direct current biases and signal swings. Therefore, the optical receiver can quickly recover information in the burst optical signal, to reduce overheads of the ineffective transmission, and improve efficiency in effective information transmission of the PON system.

In another aspect, information transmission rates of burst optical signals of the ONU 004, the ONU 005, the ONU 007, and the ONU 008 may not be exactly the same. Therefore, before recovering information in the burst optical signal, the optical receiver in the OLT 001 needs to obtain, via a rate select signal, an information transmission rate corresponding to the burst optical signal, and adjust the optical receiver to a signal receiving working mode for processing the burst optical signal of the information transmission rate, for example, the signal receiving working mode may include: adjusting statuses of a gain, a bandwidth, a control loop, and the like in the trans-impedance amplifier in the optical receiver, to implement accurate recovery of the burst optical signal of a corresponding information transmission rate.

Based on the two aspects, if the PON system in which the OLT 001 is located has a higher requirement for efficiency in effective information transmission, the optical receiver in the OLT 001 needs to be able to receive the reset signal, and enter the burst signal receiving state under an action of the reset signal. If the PON system in which the OLT 001 is located supports different information transmission rates, the optical receiver in the OLT 001 needs to be able to receive the rate select signal, and under an action of the rate select signal, to be adjusted to a signal receiving working mode of a rate indicated by the rate select signal. Therefore, if the OLT 001 shown in FIG. 2 uses the optical receiver shown in FIG. 1, the reset signal and/or the rate select signal cannot be input to and normally act on the optical receiver. Further, improvement of efficiency in effective information transmission and/or support for different information transmission rates cannot be implemented. However, the optical receiving apparatus, the optical receiving packaging apparatus, and the related device and method provided in this application may be applied to the OLT 001 in FIG. 2. A same signal pin may be multiplexed via different signals, so that improvement of efficiency in effective information transmission and/or support for different information transmission rates can be implemented, and a requirement for the signal pin of the optical receiver in the OLT 001 can be reduced, thereby reducing packaging costs of the optical receiver. A specific implementation is described in detail below.

It may be understood that the foregoing description of the optical receiver in the OLT 001 is merely an example of an application scenario of the optical receiving apparatus, the optical receiving packaging apparatus, and the related device and method in this application. The optical receiving apparatus, the optical receiving packaging apparatus, and the related device and method provided in this application are not limited to being applied to the PON system, and may be further applied to another optical communication system in which an optical receiver needs to be controlled by an additional control signal (for example, the reset signal and/or the rate select signal).

An optical communication device usually includes one or more of a receiver optical sub-assembly (ROSA), a transmitter optical sub-assembly (TOSA), and a bi-directional optical sub-assembly (BOSA). The receiver optical sub-assembly (which may also be referred to as the optical receiver, a photoreceiver, or the like) may be configured to receive an optical signal, and convert the optical signal into an electrical signal. The transmitter optical sub-assembly (which may also be referred to as an optical transmitter, an optical emitter, or the like) may be configured to convert the electrical signal into the optical signal, and transmits the optical signal. The bi-directional optical sub-assembly not only includes a function of the receiver optical sub-assembly, but also includes a function of the transmitter optical sub-assembly. In other words, it may be understood as that the bi-directional optical sub-assembly includes the receiver optical sub-assembly and the transmitter optical sub-assembly. It should be understood that the optical receiving apparatus, the optical receiving packaging apparatus, and the related device provided in embodiments of this application may be the receiver optical sub-assembly (or a part the receiver optical sub-assembly), or may be a part of the bi-directional optical sub-assembly. An optical signal processing method provided in embodiments of this application may be applied to the receiver optical sub-assembly, and may alternatively be applied to the bi-directional optical sub-assembly.

Figure 3A:
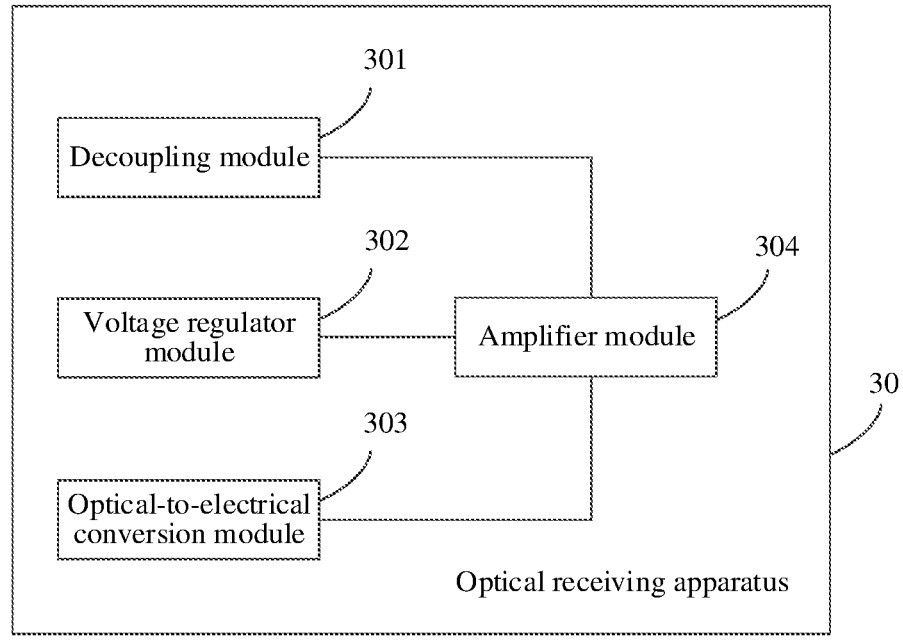
FIG. 3a is a schematic diagram of a structure of an optical receiving apparatus according to an embodiment of this application.
Figure 3B:
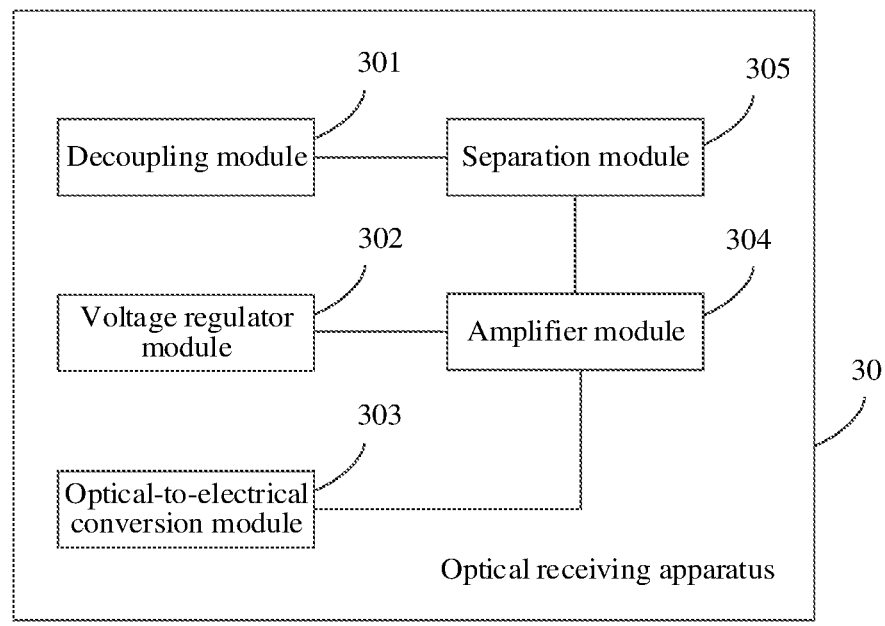
FIG. 3b is a schematic diagram of a structure of an optical receiving apparatus according to an embodiment of this application.
Figure 3C:
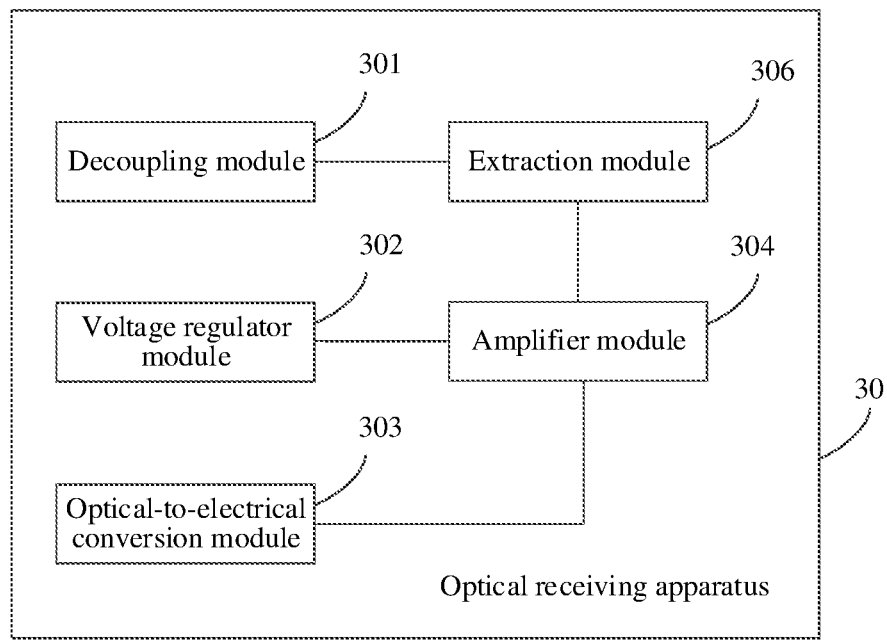
FIG. 3c is a schematic diagram of a structure of an optical receiving apparatus according to an embodiment of this application.

With reference to FIG. 3a to FIG. 14, the following describes the optical receiving apparatus, the optical receiving packaging apparatus, and the related device and method provided in embodiments of this application. First, refer to FIG. 3a to FIG. 3c. FIG. 3a to FIG. 3c are schematic diagrams of structures of an optical receiving apparatus according to an embodiment of this application. As shown in FIG. 3a, the optical receiving apparatus 30 may include at least a decoupling module 301, a voltage regulator module 302, an optical-to-electrical conversion module 303, and an amplifier module 304. Further, the optical receiving apparatus 30 may include another functional module. As shown in FIG. 3b, the optical receiving apparatus 30 may further include a separation module 305. As shown in FIG. 3c, the optical receiving apparatus 30 may further include an extraction module 306, and the like. It should be understood that connection lines among modules in embodiments of this application may indicate that the modules are connected through conducting wires, leading wires, and the like, or may indicate that the modules may be indirectly connected by using another module.

The decoupling module 301 is configured to receive a first electrical signal, and perform direct current removal processing on the first electrical signal to obtain a second electrical signal. The voltage regulator module 302 is configured to receive the first electrical signal, and perform voltage regulation processing on the first electrical signal to obtain a third electrical signal. The optical-to-electrical conversion module 303 is configured to receive a burst optical signal, and convert the received burst optical signal into a fourth electrical signal. The amplifier module 304 is configured to amplify the fourth electrical signal under control of control information in the second electrical signal and power supply of the third electrical signal, and output the amplified fourth electrical signal.

The first electrical signal carries the control information, where the control information may be used to control a working state of the amplifier module 304. The second electrical signal obtained by performing direct current removal processing on the first electrical signal is a pulse signal. The second electrical signal carries the control information. The third electrical signal obtained by performing voltage regulation processing on the first electrical signal is a signal with a constant amplitude, and may be used to provide a stable working voltage for the amplifier module 304.

In this embodiment, the control information may be coupled with a signal that supplies power to the amplifier module 304 as the first electrical signal, and then the first electrical signal is input to the optical receiving apparatus 30. This reduces a quantity of signal pins of the optical receiving apparatus 30. In addition, in the optical receiving apparatus 30, the first electrical signal may pass through the decoupling module 301 and the voltage regulator module 302, to implement decoupling of the control information and the power supply signal, so that the decoupled control information and power supply signal respectively function normally in the optical receiving apparatus 30. This ensures that under control of the control information and power supply of the power supply signal, the optical receiving apparatus 30 normally recovers information in the burst optical signal.

The control information may be any type of control information acting on the amplifier module 304. In an implementation, the control information may include reset information and/or rate selection information. The reset information is used to control the amplifier module 304 to enter a burst signal receiving state (referring to the foregoing description that the burst signal receiving state is a state in which the burst optical signal may be quickly responded to and transmission information may be quickly recovered from the burst optical signal). For example, the reset information may be information carried in the foregoing reset signal. The amplifier module 304 may have signal receiving working modes respectively corresponding to different receiving rates (referring to the foregoing description that the signal receiving working modes corresponding to different receiving rates may include different statuses of a gain, a bandwidth, a control loop, and the like in the amplifier module 304). The rate selection information is used to control the amplifier module 304 to be in a signal receiving working mode corresponding to a first receiving rate. The first receiving rate is one of the different receiving rates, for example, the rate selection information may be information carried in the rate select signal.

The first electrical signal may be a pulse signal including a specific direct current component, may be a rectangular pulse signal having a specific direct current component, a sinusoidal pulse signal having a specific direct current component, or the like. If the control information includes the reset information but does not include the rate selection information, each pulse in the first electrical signal may indicate the amplifier module 304 to enter the burst signal receiving state. If the control information includes the rate selection information but does not include the reset information, the pulse in the first electrical signal may indicate different receiving rates by using a pulse width, a pulse amplitude, a quantity of pulses within specific time, and the like of each pulse in the first electrical signal, to indicate that the amplifier module 304 is in a signal receiving working mode corresponding to a corresponding receiving rate. If the control information includes reset information and rate selection information, each pulse in the first electrical signal may indicate the amplifier module 304 to enter the burst signal receiving state. The pulse in the first electrical signal may also indicate different receiving rates by using the pulse width, the pulse amplitude, the quantity of pulses within the specific time, and the like of each pulse. FIG. 4 to FIG. 7 each are a schematic diagram of a first electrical signal according to an embodiment of this application. The following describes examples with reference to FIG. 4 to FIG. 7.

Figure 4:
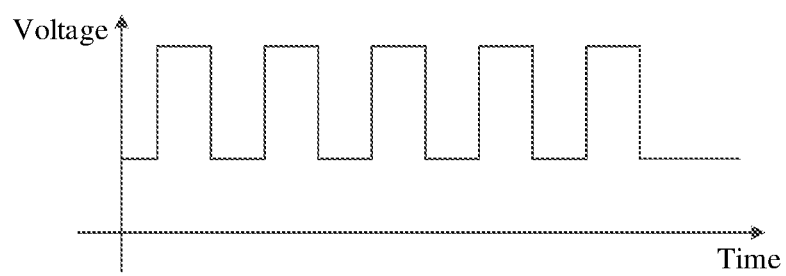
FIG. 4 is a schematic diagram of a first electrical signal according to an embodiment of this application.

Refer to FIG. 4. The first electrical signal shown in FIG. 4 is a rectangular pulse signal having a specific direct current component. Control information carried in the first electrical signal includes reset information, but does not include rate selection information. Each pulse in FIG. 4 may indicate the amplifier module 304 to enter the burst signal receiving state.

Figure 5:
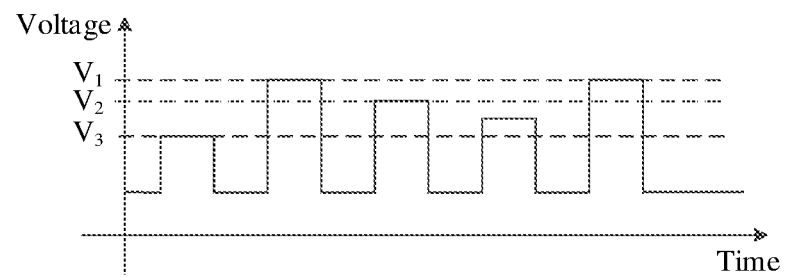
FIG. 5 is a schematic diagram of a first electrical signal according to an embodiment of this application.

Refer to FIG. 5. The first electrical signal shown in FIG. 5 is a rectangular pulse signal having a specific direct current component. Control information carried in the first electrical signal includes rate selection information, but does not include reset information. Pulses in FIG. 5 have different amplitudes. Different pulse amplitudes may represent different receiving rates. For example, in FIG. 5, a pulse whose pulse amplitude is $V_1$ represents a rate 1, a pulse whose pulse amplitude is $V_2$ represents a rate 2, and a pulse whose pulse amplitude is $V_3$ represents a rate 3.

Figure 6:
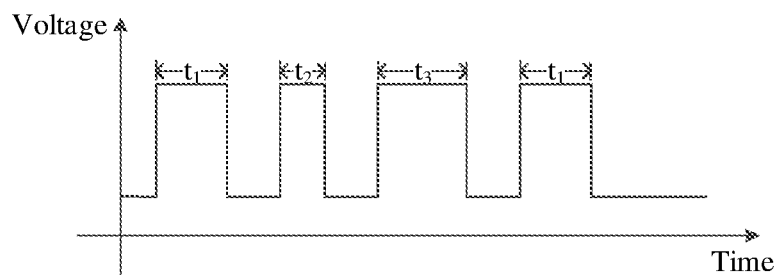
FIG. 6 is a schematic diagram of a first electrical signal according to an embodiment of this application.

Refer to FIG. 6. The first electrical signal shown in FIG. 6 is a rectangular pulse signal having a specific direct current component. Control information carried in the first electrical signal includes rate selection information, but does not include reset information. Pulses in FIG. 6 have different widths. Different pulse widths may represent different receiving rates. For example, in FIG. 6, a pulse whose pulse width is $t_1$ represents a rate 1, a pulse whose pulse width is $t_2$ represents a rate 2, and a pulse whose pulse width is $t_3$ represents a rate 3.

Figure 7:
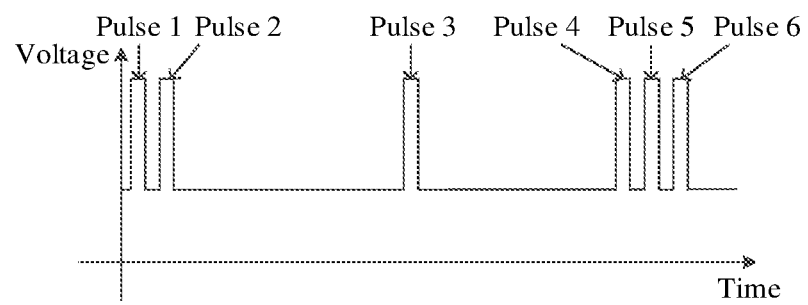
FIG. 7 is a schematic diagram of a first electrical signal according to an embodiment of this application.

Refer to FIG. 7. The first electrical signal shown in FIG. 7 is a rectangular pulse signal having a specific direct current component. Control information carried in the first electrical signal includes rate selection information, but does not include reset information. Quantities of pulses in a group of continuous pulses in the first electrical signal in FIG. 7 are different. A time interval between pulses in a specific group of continuous pulses is shorter, while a time interval between the pulse in the specific group of continuous pulses and a pulse in another group of continuous pulses is longer. For example, a time interval between pulses in a same group of continuous pulses is of ns (nanosecond) level, while a time interval between pulses in different groups of continuous pulses is of μs (microsecond) level. In FIG. 7, pulse 1 and pulse 2 are a group of continuous pulses, pulse 3 is a single group of continuous pulses, pulse 4, pulse 5, and pulse 6 are a group of continuous pulses. A quantity of pulses in a group of continuous pulses being 1 indicates a rate 1, the quantity of pulses in the group of pulses being 2 indicates a rate 2, and the quantity of pulses in the group of pulses being 3 indicates a rate 3.

A form of the first electrical signal when the control information carried in the first electrical signal includes the rate selection information and the reset information is similar to a form of the first electrical signal when the control information carried in the first electrical signal includes the rate selection information, but does not include the reset information. Another example may be described with reference to FIG. 5 to FIG. 7. When the control information includes the rate selection information and the reset information, for example, each pulse in the first electrical signal shown in FIG. 5 may indicate the amplifier module 304 to enter the burst signal receiving state, and pulses with different pulse amplitudes may represent different receiving rates. Alternatively, each pulse in the first electrical signal shown in FIG. 6 may indicate the amplifier module 304 to enter the burst optical signal receiving state, and pulses with different pulse widths may represent different receiving rates. Alternatively, each pulse in the first electrical signal shown in FIG. 7 may indicate the amplifier module 304 to enter the burst optical signal receiving state, and different quantities of pulses in a same group of continuous pulses may represent different receiving rates.

The first electrical signal may be input to the optical receiving apparatus 30 via a same signal pin of the optical receiving apparatus 30, and then separately transmitted to the decoupling module 301 and the voltage regulator module 302.

Figure 8:
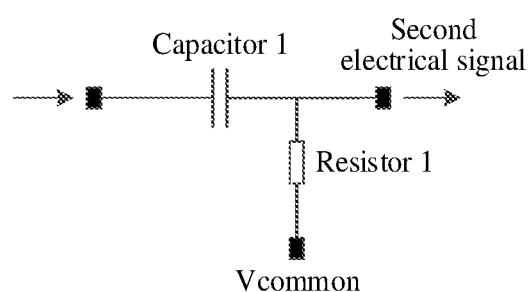
FIG. 8 is a schematic diagram of circuit implementation of a decoupling module 301 according to an embodiment of this application.

The decoupling module 301 may implement direct current removal processing on the first electrical signal in different manners, for example, filter out the direct current component in the first electrical signal in a capacitor filtering manner, a capacitor and resistor filtering manner, or the like. Refer to FIG. 8. FIG. 8 is a schematic diagram of circuit implementation of a decoupling module 301 according to an embodiment of this application. As shown in FIG. 8, after a first electrical signal is input to the decoupling module 301, a direct current component may be filtered out via a capacitor 1, to output a second electrical signal. In FIG. 8, a resistor 1 and a line on which the resistor 1 is located are optional components. One end of the resistor 1 may be connected to an output end of the capacitor 1, and the other end may be grounded or connected to a needed level, to add an additional co-module level to a pulse signal output by the capacitor 1, to obtain the second electrical signal.

It should be understood that the second electrical signal carries control information. Specific information content and a specific representation form of the control information carried by the second electrical signal are correspondingly the same as specific information content and a specific representation form of the control information carried in the first electrical signal. For example, the control information carried in the first electrical signal includes rate selection information, and different receiving rates are represented by different pulse widths in the first electrical signal. For example, a pulse width $t_1$ represents a rate 1, and a pulse width $t_2$ represents a rate 2. In this case, the second electrical signal also carries the rate selection information, and different pulse widths in the second electrical signal also represent different receiving rates. In addition, a pulse width $t_1$ represents a rate 1, and a pulse width $t_2$ represents a rate 2.

The voltage regulator module 302 may include a voltage regulator that has a voltage regulation processing function for the first electrical signal, for example, implemented by using a low drop-out (LDO) linear voltage regulator or a bandgap voltage reference (bandgap voltage reference) circuit. An alternating current component is removed from the first electrical signal by outputting voltage regulation processing on the first electrical signal, to obtain a third electrical signal with a constant amplitude.

In some embodiments, the control information may include the reset information and the rate selection information. The optical receiving apparatus 30 may further include a separation module 305, configured to separately extract the reset information and the rate selection information from the second electrical signal under power supply of the third electrical signal, and separately transmit the reset information and the rate selection information to the amplifier module 304. The reset information and the rate selection information may be transmitted to the amplifier module 304 via two electrical signals, or may be transmitted to the amplifier module 304 at different times via one electrical signal.

The reset information in the control information may be indicated by using a pulse in the second electrical signal. Any pulse may indicate the amplifier module 304 to enter a burst signal receiving state. The rate selection information may have a plurality of indication manners. Therefore, the separation module 305 may separate the reset information and the rate selection information in different manners based on different indication manners of the rate selection information. Specific implementations are described in the following situations.

In a first implementation, if different rate selection information is represented by using different pulse amplitudes of pulses in the second electrical signal, the separation module 305 may be specifically configured to perform pulse detection on the second electrical signal to obtain the reset information, perform peak detection on the second electrical signal, and obtain the rate selection information based on a detected signal peak.

In a more specific implementation, it is assumed that the amplifier module 304 has signal receiving working modes respectively corresponding to N different receiving rates, where N is a positive integer. The separation module 305 may further include a first pulse detection unit, a first peak detection unit, N first comparison units, and a first logic operation unit.

The first pulse detection unit is configured to perform pulse detection on the second electrical signal, and output a pulse signal of one clock cycle when detecting the pulse signal. The pulse signal output by the first pulse detection unit is used to trigger the amplifier module 304 to enter the burst signal receiving state.

The first peak detection unit is configured to perform peak detection on the second electrical signal, and output a detected first peak signal.

Each first comparison unit in the N first comparison units is configured to compare a magnitude of a received first reference signal with a magnitude of the first peak signal, and output a first comparison result level. First reference signals received by the N first comparison units are different.

The first logic operation unit is configured to perform a logic operation on the N receiving rates based on first comparison result levels output by the N first comparison units, and output rate indicator bit levels respectively corresponding to the N receiving rates. In the rate indicator bit levels respectively corresponding to the N receiving rates, only a rate indicator bit level corresponding to a first receiving rate is a first level. The first level is used to control the amplifier module 304 to be in a signal receiving working mode corresponding to the first receiving rate. For example, the first level is a high level, in other words, a receiving rate corresponding to a high level in a rate receiving bit level is the first receiving rate, and rate receiving bit levels corresponding to other receiving rates are all low levels. Further, the amplifier module 304 may be adjusted to or maintain the signal receiving working mode corresponding to the first receiving rate whose rate receiving bit level is the high level.

Figure 9:
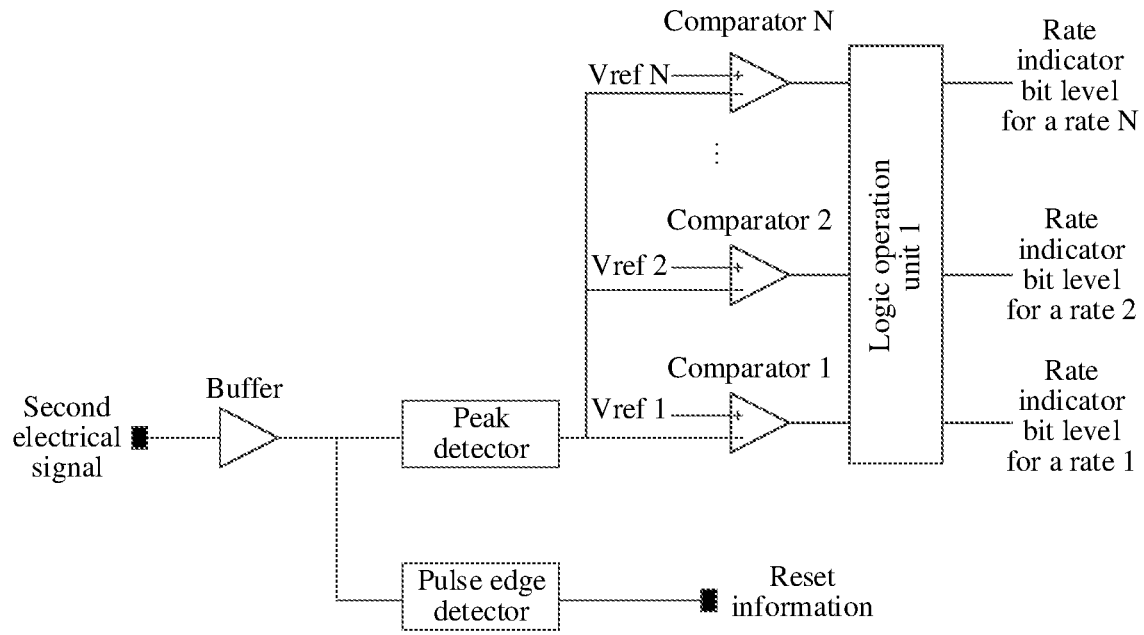
FIG. 9 is a schematic diagram of circuit implementation of a separation module 305 according to an embodiment of this application.

Further, the first pulse detection unit may be implemented by using various pulse edge detectors. The first peak detection unit may be implemented by using various peak detectors. The first comparison units may be implemented by using various comparators (such as voltage comparators). Logic operation units may be implemented by using various logic elements, logic units, logic gate circuits, or logic function circuits including logic elements and logic gate circuits. FIG. 9 is used as an example for description.

Refer to FIG. 9. FIG. 9 is a schematic diagram of circuit implementation of a separation module 305 according to an embodiment of this application. As shown in FIG. 9, in the separation module 305, a function of a first pulse detection unit is implemented by using a pulse edge detector, a function of a first peak detection unit is implemented by using a peak detector, functions of N first comparison units are respectively implemented by using a comparator 1, a comparator 2, . . . , and a comparator N, and a function of a first logic operation unit is implemented by using a logic operation unit 1.

A buffer in FIG. 9 is an optional component. The buffer may be a 1:1 amplifier, and is configured to buffer an input second electrical signal, to perform impedance matching, reduce signal distortion, and improve signal anti-interference.

In FIG. 9, the comparator 1, the comparator 2, . . . , and the comparator N each include a positive input end and a negative input end. The positive input ends of the comparator 1, the comparator 2, . . . , and the comparator N may be respectively connected to reference voltages Vref 1, Vref 2, . . . , and Vref N, and the negative input ends are all connected to a first peak signal output by the peak detector. Vref 1, Vref 2, . . . , and Vref N are different from each other. In addition, amplitudes of reference voltages received by the comparators are correlated with pulse peaks corresponding to N different receiving rates in the second electrical signal. For example, the pulse peaks respectively corresponding to a rate 1, a rate 2, . . . , and a rate N in the second electrical signal are respectively $U_1, U_2, \ldots,$ and $U_N$ (where $U_1$ to $U_N$ increase one by one). In this case, relationships between Vref 1, Vref 2, . . . , and Vref N and the pulse peaks may be $U_1<$Vref $1<U_2$, $U_2<$Vref $2<U_3$, . . . , and $U_N<$Vref N. The comparator 1, the comparator 2, . . . , and the comparator N respectively output a first comparison result level corresponding to the rate 1, a first comparison result level corresponding to the rate 2, . . . , and a first comparison result level corresponding to the rate N.

In FIG. 9, the second electrical signal may be separately transmitted to the peak detector and the pulse edge detector via the buffer. The pulse edge detector detects a pulse signal in the second electrical signal, and outputs the pulse signal carrying reset information. In addition, the peak detector detects a peak of the second electrical signal, and separately transmits the detected first peak signal to N comparators. Each comparator compares a level of the first peak signal with a reference voltage of each comparator. When the reference voltage of each comparator is higher than the level of the first peak signal, the first comparison result level output by each comparator is the high level. On the contrary, the output first comparison result level is a low level. Then, first comparison result levels corresponding to receiving rates are transmitted to the logic operation unit 1 for logic operations, to output rate indicator bit levels corresponding to the receiving rates. In an implementation, the logic operation unit 1 may implement logic operations corresponding to the following logic operation formulas: When i is an integer and $1<i\leq N$, a rate indicator bit level corresponding to a rate i is equal to (a first comparison result level corresponding to the rate i) logic AND [logic NOT (a first comparison result level corresponding to a rate i−1)], . . . , and logic AND [logic NOT (the first comparison result level corresponding to the rate 1)]; and when i=1, the rate indicator bit level corresponding to the rate i is equal to the first comparison result level corresponding to the rate 1. A logic operation performed by the logic operation unit 1 is described by using an example in which a pulse indicating the rate 2 occurs in the second electrical signal at a specific time.

If the pulse indicating the rate 2 occurs in the second electrical signal at a specific time, in other words, in this case, a pulse peak output by the peak detector is $U_2$, and based on magnitude relationships between $U_2$ and Vref 1, Vref 2, . . . , and Vref N, output levels of the comparators may be obtained, as shown in Table 1 (where 1 represents a high level, and 0 represents a low level).

TABLE 1

| Comparator 1 | Comparator 2 | Comparator 3 | . . . | Comparator N − 1 | Comparator N |
|---|---|---|---|---|---|
| 0 | 1 | 1 | . . . | 1 | 1 |

Further, the rate indicator bit levels respectively corresponding to the rate 1 to the rate N may be obtained based on the logic operation formulas, as shown in Table 2. (where 1 represents a high level, and 0 represents a low level).

TABLE 2

| Rate 1 | Rate 2 | Rate 3 | . . . | Rate N − 1 | Rate N |
|---|---|---|---|---|---|
| 0 | 1 | 0 | . . . | 0 | 0 |

In the rate indicator bit levels corresponding to the rates, only a quantity indicator bit level corresponding to the rate 2 is a high level, so that the rate 2 indicated by rate selection information in a current second electrical signal may be obtained.

In a second implementation, if different rate selection information is represented by using different pulse widths of pulses in the second electrical signal, the separation module 305 may be specifically configured to perform pulse detection on the second electrical signal to obtain the reset information, perform peak duration detection on the second electrical signal, and obtain the rate selection information based on detected peak duration.

In a more specific implementation, it is assumed that the amplifier module 304 has signal receiving working modes respectively corresponding to the N different receiving rates, where N is a positive integer. The separation module 305 may further include a second pulse detection unit, a second peak detection unit, a second comparison unit, N signal delay units, N second logic operation units, and a third logic operation unit.

The second pulse detection unit is configured to perform pulse detection on the second electrical signal, and output the pulse signal of one clock cycle when detecting the pulse signal. The pulse signal output by the second pulse detection unit is used to trigger the amplifier module 304 to enter a burst signal receiving state.

The second peak detection unit is configured to perform peak detection on the second electrical signal, and output a detected second peak signal. Peak duration of the second peak signal is positively correlated with a pulse width in the second electrical signal. For example, the peak duration of the second peak signal is equal to a pulse width of a corresponding pulse in the second electrical signal.

The second comparison unit is configured to compare a magnitude of a received second reference signal with a magnitude of the second peak signal, and output a second comparison result level. It should be understood that, if the second comparison result level is output as the high level when the magnitude of the second peak signal is greater than the magnitude of the second reference signal, a pulse width in the second comparison result level is positively correlated with a pulse width of the currently compared second peak signal. For example, the pulse width in the second comparison result level is equal to the pulse width of the currently compared second peak signal currently.

Each delay unit in the N signal delay units is configured to delay the second comparison result level to obtain a first delay signal. Delay duration of the N signal delay units for the second comparison result level is different.

One signal delay unit is connected to one second logic operation unit. The second logic operation unit is configured to perform a logic AND operation on the received first delay signal and the second comparison result level to obtain an operation result indication level.

The third logic operation unit is configured to perform a logic operation on N receiving rates based on operation result indication levels output by the N second logic operation units, and output rate indicator bit levels respectively corresponding to the N receiving rates. In the rate indicator bit levels respectively corresponding to the N receiving rates, only a rate indicator bit level corresponding to a first receiving rate is a second level. The second level is used to control the amplifier module 304 to be in a signal receiving working mode corresponding to the first receiving rate.

Figure 10:
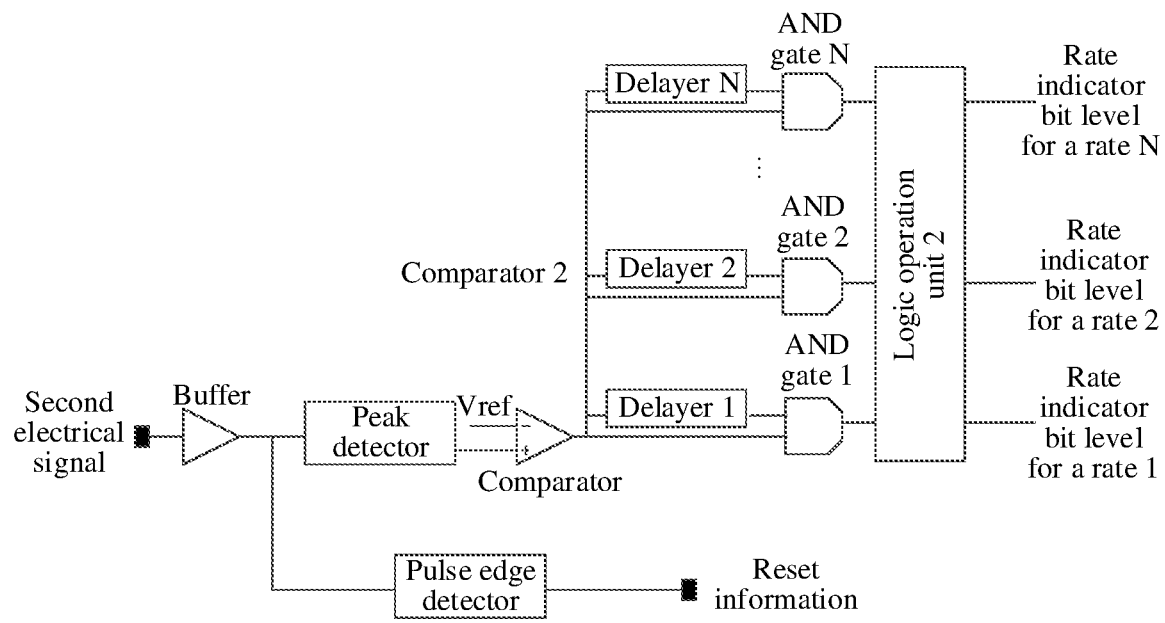
FIG. 10 is a schematic diagram of circuit implementation of another separation module 305 according to an embodiment of this application.

Further, the second pulse detection unit may be implemented by using various pulse edge detectors. The second peak detection unit may be implemented by using various peak detectors. The second comparison units may be implemented by using various comparators (such as voltage comparators). The signal delay unit may be implemented by using signal delayers. The N second logic operation units or the third logic operation unit may be implemented by using various logic elements, logic units, logic gate circuits, or logic function circuits including logic elements and logic gate circuits. FIG. 10 is used as an example for description.

Refer to FIG. 10. FIG. 10 is a schematic diagram of circuit implementation of another separation module 305 according to an embodiment of this application. As shown in FIG. 10, in the separation module 305, a function of a second pulse detection unit is implemented by using a pulse edge detector, a function of a second peak detection unit is implemented by using a peak detector, a function of a second comparison unit is implemented by using a comparator, functions of N second comparison units are respectively implemented by using a delayer 1, a delayer 2, . . . , and a delayer N, functions of N second logic operation units are respectively implemented by using an AND gate 1, an AND gate 2, . . . , and an AND gate N, and a function of a third logic operation unit is implemented by using a logic operation unit 2.

A buffer in FIG. 10 is an optional component. For beneficial effects, refer to beneficial effects of the buffer in FIG. 9.

In FIG. 10, the comparator includes a positive input end and a negative input end. The positive input end of the comparator may access a reference voltage Vref, and the negative input end accesses a second peak signal output by the peak detector. The comparator may identify a peak of the second peak signal by accessing Vref (where the peak may be a pulse amplitude of a pulse in a second electrical signal). For example, if the pulse amplitude in the second electrical signal (that is, the peak of the second peak signal) is $U_1$, Vref may be a reference voltage between $(0, U_1)$.

A delayer in FIG. 10 may delay a signal output by the comparator. Delay duration of N delayers for a second comparison result level is different. The delay duration of the delayers is correlated with pulse widths corresponding to N different receiving rates in the second electrical signal. For example, pulse widths corresponding to a rate 1, a rate 2, . . . , and a rate N in the second electrical signal are respectively $t_1, t_2, \ldots,$ and $t_N$ (where $t_1$ to $t_N$ increase one by one). Delay duration corresponding to the delayer 1, the delayer 2, . . . , and the delayer N is respectively $d_1$, $d_2, \ldots,$ and $d_N$. Relationships between $d_1$, $d_2, \ldots,$ and $d_N$ and the pulse widths may be $t_1 < d_1 < t_2$, $t_2 < d_2 < t_3$, . . . , and $d_N < t_N$.

In FIG. 10, the second electrical signal may be separately transmitted to the peak detector and the pulse edge detector via the buffer. The pulse edge detector detects a pulse in the second electrical signal, and outputs a pulse signal carrying reset information. In addition, the peak detector detects a peak of the second electrical signal, and transmits the detected second peak signal to the comparator. The comparator compares the second peak signal with a reference voltage Vref of the comparator. When the second peak signal is higher than a reference voltage of the second peak signal, the second comparison result level output by the comparator is a high level. On the contrary, the output second comparison result level is a low level. Further, the second comparison result level output by the comparator is separately transmitted to the N delayers and N AND gates. When delaying the second comparison result level, the delayers obtain first delay signals. A first delay signal output by one delayer is transmitted to one AND gate, so that a logic AND operation is separately performed on N different first delay signals and the second comparison result level by using the N AND gates, to obtain operation result indication levels respectively corresponding to different receiving rates.

It should be noted that, if delay duration corresponding to the delayer 1, the delayer 2, . . . , and the delayer N is separately equal to pulse widths respectively corresponding to the rate 1, the rate 2, . . . , and the rate N in the second electrical signal. In this case, the AND gate 1, the AND gate 2, . . . , and the AND gate N respectively output an operation result indication level corresponding to the rate 1, an operation result indication level corresponding to the rate 2, . . . , and an operation result indication level corresponding to the rate N.

Further, the operation result indication levels corresponding to the different receiving rates output by the N AND gates are transmitted to the logic operation unit 2 for logic operation, and rate indicator bit levels corresponding to the receiving rates are output. In an implementation, the logic operation unit 2 may implement logic operations corresponding to the following logic operation formulas: When i is an integer and $1 < i \leq N$, a rate indicator bit level corresponding to a rate i is equal to [logic NOT (an operation result indication level corresponding to the rate i)] logic AND (an operation result indication level corresponding to a rate i−1), . . . , and logic AND (an operation result indication level corresponding to the rate 1); and when i=1, the rate indicator bit level corresponding to the rate i is equal to logic NOT (the operation result indication level corresponding to the rate 1). The second electrical signal corresponding to an example in which the second electrical signal at time $T_3$ in FIG. 11 indicates a rate 3 is used as an example to describe a logic operation performed by the logic operation unit 2.

Figure 11:
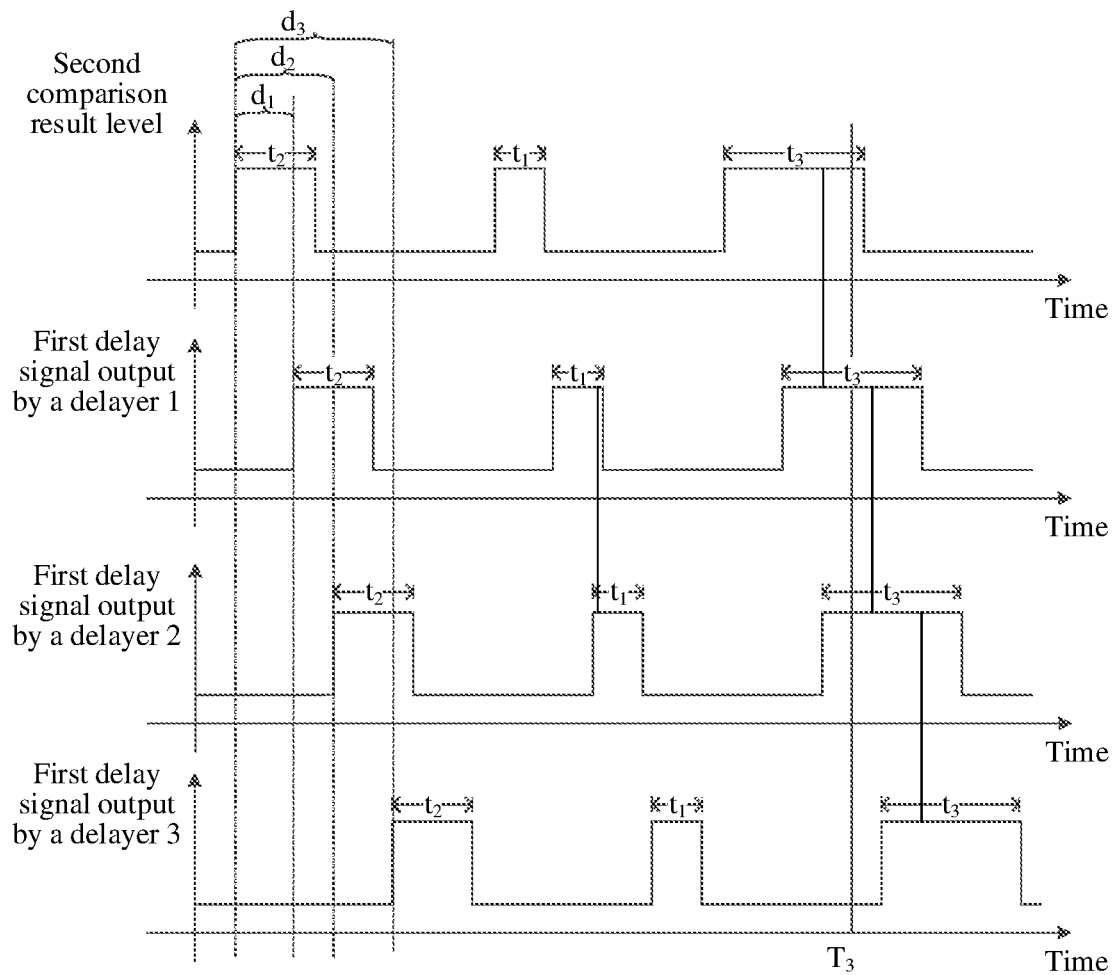
FIG. 11 is a schematic diagram of a second comparison result level and first delay signals that are output by delayers according to an embodiment of this application.

Refer to FIG. 11. FIG. 11 is a schematic diagram of a second comparison result level and first delay signals that are output by delayers according to an embodiment of this application. It is assumed that a second electrical signal corresponding to FIG. 11 has merely three pulses whose pulse widths are $t_1, t_2,$ and $t_3$ respectively, and represent rate 1, rate 2, and rate 3 respectively. Delay duration separately corresponding to a delayer 1, a delayer 2, and a delayer 3 is respectively $d_1, d_2,$ and $d_3$. Relationships between $t_1, t_2, t_3$, $d_1, d_2,$ and $d_3$ meet: $t_1 < d_1 < t_2$, $t_2 < d_2 < t_3$, and $t_3 < d_3$. FIG. 11 separately shows changes of the second comparison result level output by a comparator, a first delay signal output by a delayer 1, a first delay signal output by a delayer 2, and a first delay signal output by a delayer 3 with time. For the time $T_3$, the second comparison result level output by the comparator is a high level. The first delay signals output by the delayer 1, the delayer 2, and the delayer 3, and operation result indication levels respectively output by an AND gate 1, an AND gate 2, and an AND gate 3 are shown in Table 3 and Table 4.

TABLE 3

| Delayer 1 | Delayer 2 | Delayer 3 |
|---|---|---|
| 1 | 1 | 0 |

TABLE 4

| AND gate 1 | AND gate 2 | AND gate 3 |
|---|---|---|
| 1 | 1 | 0 |

Further, rate indicator bit levels respectively corresponding to the rate 1, the rate 2, and the rate 3 may be obtained based on the logic operation formula, as shown in Table 5.

TABLE 5

| Rate 1 | Rate 2 | Rate 3 |
|---|---|---|
| 0 | 0 | 1 |

In the rate indicator bit levels corresponding to the rates, only a quantity indicator bit level corresponding to the rate 3 is a high level, so that the rate 3 indicated by rate selection information in a second electrical signal at the time $T_3$ may be obtained.

In a third implementation, if different rate selection information is represented by a quantity of pulses in a group of continuous pulses in the second electrical signal, a separation module 305 may be specifically configured to perform pulse detection on the second electrical signal, obtain the reset information based on a plurality of detected pulse signals, and obtain the rate selection information based on the quantity of detected pulses within a detection periodicity. The detection periodicity may be a periodicity starting from a detection time of a current pulse when a detection time interval between the current pulse and a previous pulse that are detected by the separation module 305 is greater than a first time threshold. After the separation module 305 detects a specific pulse, when no new pulse is detected when the first time threshold is exceeded, the detection periodicity ends. For example, the first time threshold is 100 ns. If the separation module 305 detects a new pulse within 100 ns after detecting a pulse, the new pulse and the pulse belong to a same group of continuous pulses in a same detection periodicity, if no new pulse is detected within 100 ns after the pulse is detected, a detection periodicity to which the pulse belongs ends. The first time threshold may be correlated with a time interval between pulses in a group of continuous pulses in the second electrical signal. For example, if time intervals between pulses in a group of continuous pulses in the second electrical signal are equal, and pulse widths are equal, the first time threshold may be equal to a sum of the time interval and the pulse width. If time intervals between pulses in a group of continuous pulses in the second electrical signal are not completely equal, and pulse widths are not completely equal, the first time threshold may be equal to a sum of a maximum time interval and a maximum pulse width.

In a more specific implementation, it is assumed that an amplifier module 304 has signal receiving working modes respectively corresponding to N different receiving rates, where N is a positive integer. The separation module 305 may further include a third pulse detection unit and a polling triggering unit.

The third pulse detection unit is configured to perform pulse detection on the second electrical signal, and output a pulse signal of one clock cycle when detecting the pulse signal. The pulse signal output by the third pulse detection unit is used to trigger the amplifier module 304 to enter a burst signal receiving state.

The polling triggering unit is configured to detect the pulse signal within the detection periodicity, under triggering of any pulse signal detected within the detection periodicity, determine a first receiving rate from the N receiving rates based on a first rate polling sequence, and set a rate indicator bit level corresponding to the first receiving rate to a third level. The polling triggering unit is further configured to output rate indicator bit levels respectively corresponding to the N receiving rates. In the rate indicator bit levels respectively corresponding to the N receiving rates, only the rate indicator bit level corresponding to the first receiving rate is the third level. The third level is used to control the amplifier module 304 to be in a signal receiving working mode corresponding to the first receiving rate.

Figure 12:
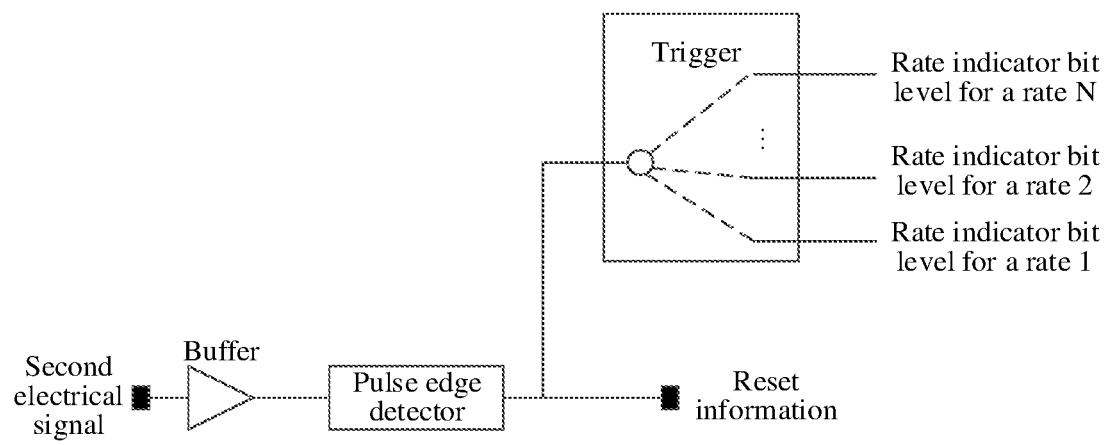
FIG. 12 is a schematic diagram of circuit implementation of still another separation module 305 according to an embodiment of this application.

Further, the third pulse detection unit may be implemented by using a pulse edge detector, and the polling triggering unit may be implemented by using a trigger. FIG. 12 is used as an example for description.

Refer to FIG. 12. FIG. 12 is a schematic diagram of circuit implementation of still another separation module 305 according to an embodiment of this application. As shown in FIG. 12, in the separation module 305, a function of a third pulse detection unit is implemented by using a pulse edge detector, and a function of a polling triggering unit is implemented by using a trigger.

A buffer in FIG. 12 is an optional component. For beneficial effects, refer to beneficial effects of the buffer in FIG. 9.

The trigger in FIG. 12 has a specific first rate polling sequence. When triggered by a pulse signal, the trigger may determine a first receiving rate based on the first rate polling sequence, and set a corresponding rate indicator bit level to a unique high level in rate indicator bit levels corresponding to all receiving rates. The first rate polling sequence may be correlated with a correspondence between quantities of pulses in a group of continuous pulses in a second electrical signal and receiving rates. In an implementation, in the first rate polling sequence, the receiving rates may be arranged in ascending order based on the quantities of pulses corresponding to a group of continuous pulses in the second electrical signal. For example, quantities of pulses corresponding to a rate 1, a rate 2, . . . , and a rate N in the second electrical signal in a group of continuous pulses in the second electrical signal may be 1, 2, . . . , and N respectively.

The trigger is in a reset state at any time (in other words, the output rate indicator bit levels corresponding to receiving rates are all high levels or low levels), or in an indication state for a specific receiving rate (in other words, in the output rate indicator bit levels corresponding to the receiving rates, only a level corresponding to the specific receiving rate is a high level). If the trigger is in a reset state, after the trigger receives a pulse, the rate 1 is the first receiving rate, and the trigger sets a rate indicator bit level corresponding to the rate 1 to the unique high level in the rate indicator bit levels corresponding to all the receiving rates, and outputs the rate indicator bit level. If the trigger is in an indication state for a specific receiving rate, within a second time threshold from entering the indication state (that is, within a second time threshold after a latest pulse is received), if receiving a new pulse, the trigger may enter an indication state for a next receiving rate (which is a new first receiving rate) in the first rate polling sequence; and if receiving no new pulse, the trigger may be recovered to the reset state. The second time threshold may be the same as the first time threshold.

In FIG. 12, the second electrical signal may be transmitted to the pulse edge detector via the buffer, and the pulse edge detector outputs a detected pulse signal by detecting a pulse in the second electrical signal. Any pulse in the pulse signal can trigger an amplifier module 304 to enter a burst signal receiving state. In addition, the pulse in the pulse signal may trigger the trigger, so that when triggered by different quantities of pulses, the trigger indicates different receiving rates. An example in which a group of continuous pulses in the second electrical signal includes three pulses that trigger the trigger to indicate a rate 3 is used to describe an indication logic of the trigger.

When the trigger in the reset state receives a first pulse in the group of continuous pulses, the rate 1 is the first receiving rate, and the trigger sets the rate indicator bit level corresponding to the rate 1 to the unique high level in the rate indicator bit levels corresponding to all the receiving rates, and outputs the rate indicator bit level. When a second pulse in the group of continuous pulses is received, based on the first rate polling sequence, the rate 2 is the first receiving rate, and the trigger sets a rate indicator bit level corresponding to the rate 2 to the unique high level in the rate indicator bit levels corresponding to all the receiving rates, and outputs the rate indicator bit level. When a third pulse in the group of continuous pulses is received, based on the first rate polling sequence, the rate 3 is the first receiving rate, and the trigger sets a rate indicator bit level corresponding to the rate 3 to the unique high level in the rate indicator bit levels corresponding to all the receiving rates, and outputs the rate indicator bit level. It should be understood that although the group of continuous pulses includes three pulses, and indicates the rate 3, a period of time after the first pulse is received and before the second pulse is received, the trigger indicates the rate 1, and a period of time after the second pulse is received and before the third pulse is received, the trigger indicates the rate 2. Because a time interval between pulses in a same group of continuous pulses is small, for example, the time interval may be a time interval of ns level, and after the trigger receives the third pulse, an indication time for the rate 3 is long, for example, a time interval between different groups of continuous pulses may be a time interval of µs level, an error caused by transient indication of the rate 1 and the rate 2 may be negligible for the trigger.

In some embodiments, the control information includes one of the reset information or the rate selection information. The optical receiving apparatus 30 may further include an extraction module 306, configured to: under power supply of a third electrical signal, extract the control information from the second electrical signal, and transmit the control information to the amplifier module 304. Specific implementations are described in the following situations.

When the control information includes the reset information, the extraction module 306 may be specifically configured to perform pulse detection on the second electrical signal to obtain the reset information. For example, in actual application, the second electrical signal obtained through direct current removal processing by the decoupling module 301 is not a standard pulse signal, and cannot act well on the amplifier module 304. The extraction module 306 outputs a more standard pulse signal by performing pulse detection on the second electrical signal, to control the amplifier module 304 more accurately.

The following cases are included when the control information includes the rate selection information:

If different rate selection information is represented by using different pulse amplitudes of pulses in the second electrical signal, the extraction module 306 may be specifically configured to perform peak detection on the second electrical signal, and obtain the rate selection information based on a detected signal peak. For example, the extraction module 306 may implement this function by using the peak detector in FIG. 9 and a circuit following the peak detector.

If different rate selection information is represented by using different pulse widths of pulses in the second electrical signal, the extraction module 306 may be specifically configured to perform peak duration detection on the second electrical signal, and obtain the rate selection information based on detected peak duration. For example, the extraction module 306 may implement this function by using the peak detector in FIG. 10 and a circuit following the peak detector.

If different rate selection information is represented by quantities of pulses in a group of continuous pulses in the second electrical signal, the extraction module 306 may be specifically configured to perform pulse detection on the second electrical signal, and obtain the rate selection information based on the quantities of pulses detected within a detection periodicity. The detection periodicity may be a periodicity starting from a detection time of a current pulse when a detection time interval between the current pulse and a previous pulse that are detected by the extraction module 306 is greater than a first time threshold. After the extraction module 306 detects a specific pulse, when no new pulse is detected when the first time threshold is exceeded, the detection periodicity ends. For example, the extraction module 306 may implement this function by using a circuit in FIG. 12.

It should be understood that specific function implementation of the separation module 305 or the extraction module 306 may change with different indication manners of the control information in the first electrical signal. The foregoing is merely examples of the specific function implementation of the two modules. For implementations of the two modules in another indication manner of the control information, exhaustion is not performed herein. In addition, extraction of the rate selection information by the separation module 305 or the extraction module 306 described above may also be implemented in another manner. Exhaustion is not performed herein.

In addition, the optical-to-electrical conversion module 303 may include a component such as a photoelectric detector or a photodiode, and may perform optical-to-electrical conversion on the received burst optical signal to obtain the fourth electrical signal. The amplifier module 304 may include a trans-impedance amplifier, and may quickly amplify the fourth electrical signal and output the fourth electrical signal under control of the control information and power supply of the third electrical signal.

It should be understood that in specific implementation, the modules such as the decoupling module 301, the voltage regulator module 302, the separation module 305, and the extraction module 306 may be independent modules in actual application, or may be modules in which some modules are integrated. For example, the decoupling module 301 and the separation module 305 may be integrated together, and one or more modules may be integrated together with the amplifier module 304. A specific implementation form is not limited.

An embodiment of this application further provides an optical receiving packaging apparatus. The optical receiving packaging apparatus includes at least five signal pins, a photoelectric detector, and a trans-impedance amplifier. Further, the optical receiving packaging apparatus may further include other components, such as a connection line among the photoelectric detector, the trans-impedance amplifier, and a signal pin, and a filter that performs noise reduction processing. For another example, in addition to receiving a first electrical signal, receiving a fifth electrical signal, grounding, and receiving the amplified fourth electrical signal output differentially that are described, if the optical receiving packaging apparatus further needs to receive or output another electrical signal, the optical receiving packaging apparatus may further include another signal pin, or the like.

Specifically, in the optical receiving packaging apparatus, the five signal pins include a first signal pin, a second signal pin, a third signal pin, a fourth signal pin, and a fifth signal pin.

The first signal pin is used for inputting the first electrical signal that carries control information. The control information is used to control a working state of the trans-impedance amplifier.

The second signal pin is used for inputting the fifth electrical signal, and the fifth signal pin is used for grounding.

The photoelectric detector is configured to convert a received burst optical signal into the fourth electrical signal under power supply of the fifth electrical signal.

The trans-impedance amplifier is configured to receive the first electrical signal, perform direct current filtering processing on the first electrical signal to obtain a second electrical signal, and perform voltage regulation processing on the first electrical signal to obtain a third electrical signal. The second electrical signal carries the control information. The trans-impedance amplifier is further configured to amplify the fourth electrical signal under control of the control information in the second electrical signal and power supply of the third electrical signal, to obtain the amplified fourth electrical signal.

The third signal pin and the fourth signal pin are used for differentially outputting the fourth electrical signal amplified by the trans-impedance amplifier.

In some embodiments, the control information includes reset information and/or rate selection information. The reset information is used to control the trans-impedance amplifier to enter a burst signal receiving state. The trans-impedance amplifier includes signal receiving working modes respectively corresponding to N different receiving rates, where N is a positive integer. The rate selection information is used to control the trans-impedance amplifier to be in a signal receiving working mode corresponding to a first receiving rate, where the first receiving rate is one of the N different receiving rates.

For descriptions of the electrical signals and the control information, refer to descriptions of a same object in the embodiment corresponding to FIG. 3*a*. Details are not described herein again. In addition, the photoelectric detector in the optical receiving packaging apparatus may implement a function of the optical-to-electrical conversion module 303 in FIG. 3*a*. The trans-impedance amplifier may implement a function of the amplifier module 304 in FIG. 3*a*. For use of each component in the optical receiving packaging apparatus for the electrical signals and the control information, and for outputting of the electrical signals, refer to corresponding descriptions in the embodiment corresponding to FIG. 3*a*. Details are not described again.

In this embodiment, the control information may be coupled with a signal that supplies power to the trans-impedance amplifier as the first electrical signal, and then the first electrical signal is input to the optical receiving packaging apparatus via the first signal pin. This reduces a quantity of signal pins of the optical receiving packaging apparatus. In addition, in the optical receiving packaging apparatus, the first electrical signal may pass through the trans-impedance amplifier, to implement decoupling of the control information and the power supply signal, so that the decoupled control information and power supply signal respectively function normally in the trans-impedance amplifier. This ensures that under control of the control information and power supply of the power supply signal, the optical receiving packaging apparatus normally recovers information in the burst optical signal.

The optical receiving packaging apparatus in this embodiment may be packaged in different packaging forms. For example, in a specific manner, the optical receiving packaging apparatus may be packaged in any TO-CAN coaxial packaging form. In another implementation, the optical receiving packaging apparatus may alternatively be packaged in a butterfly-shaped packaging form, a COB (chip on board, chip on board) packaging form, a BOX (box-shaped) packaging form, or the like. An example is provided with reference to FIG. 13.

Figure 13:
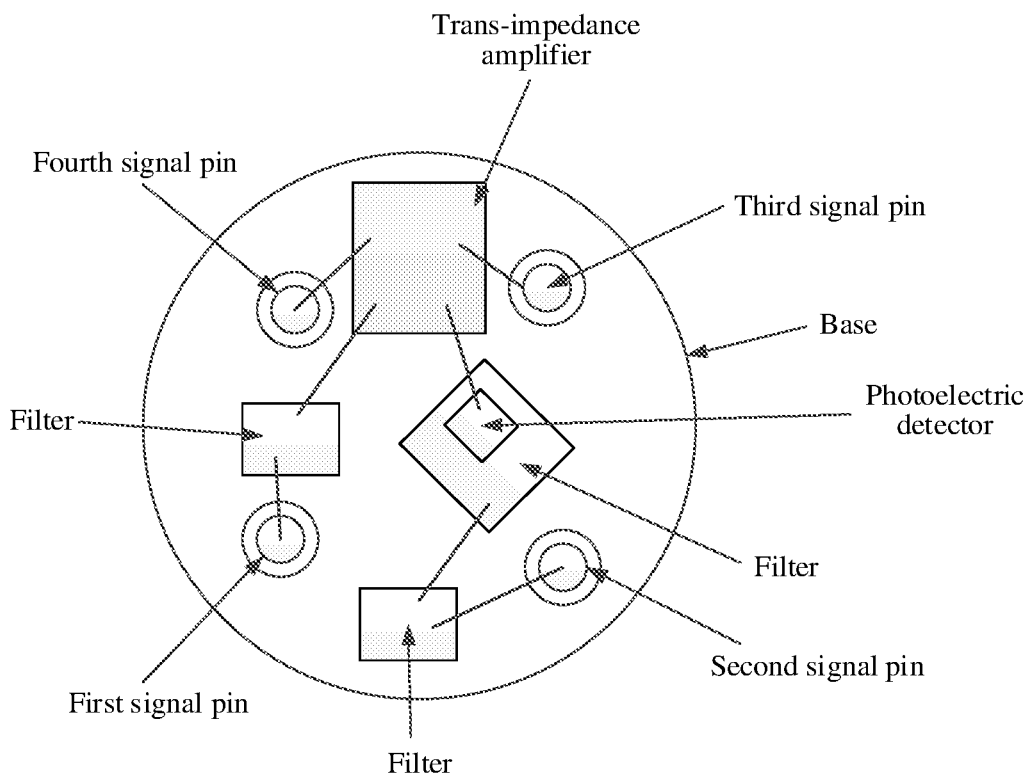
FIG. 13 is a schematic diagram of an internal structure of an optical receiving packaging apparatus according to an embodiment of this application.

Refer to FIG. 13. FIG. 13 is a schematic diagram of an internal structure of an optical receiving packaging apparatus according to an embodiment of this application. FIG. 13 shows a part below a pipe cap and above a base when the optical receiving packaging apparatus is packaged in the 5-pin TO CAN form. The fifth signal pin is a grounding signal pin connected to a bottom of the base, and is not shown in FIG. 13.

An embodiment of this application further provides an optical receiving device, including an optical receiving apparatus and a signal coupling apparatus.

The signal coupling apparatus is configured to receive a sixth electrical signal and a seventh electrical signal, couple the sixth electrical signal and the seventh electrical signal, and output a first electrical signal. The sixth electrical signal is used to supply power to the optical receiving device, and the seventh electrical signal carries control information. The control information is used to control a working state of the optical receiving apparatus.

The optical receiving apparatus is configured to receive a first electrical signal, perform direct current removal processing on the first electrical signal to obtain a second electrical signal, and perform voltage regulation processing on the first electrical signal to obtain a third electrical signal. The optical receiving apparatus is further configured to receive a burst optical signal and a fifth electrical signal, under power supply of the fifth electrical signal, convert the received burst optical signal into a fourth electrical signal, and under control of the second electrical signal and power supply of the third electrical signal, amplify and output the fourth electrical signal.

The sixth electrical signal may be a direct current electrical signal, used to supply power to the optical receiving device, and may be denoted as a VCC signal. The seventh electrical signal may be a pulse signal, and carries the control information. The control information may include reset information and/or rate selection information. The seventh electrical signal may be sent by another optical communication device to the optical receiving device. For example, the optical receiving device may be a part of an OLT. The seventh electrical signal may be from a media access control (MAC) device or another upper-layer device in a PON system in which the OLT is located.

For descriptions of the reset information and the rate selection information, refer to corresponding descriptions in the corresponding embodiment in FIG. 3a. Details are not described again.

When including both the reset information and the rate selection information, the seventh electrical signal may indicate the reset information by using a pulse in the seventh electrical signal, and indicate the rate selection information by using a pulse amplitude, a pulse width, or a quantity of pulses in a group of continuous pulses. For a specific indication manner, refer to the indication manner of the rate information in the first electrical signal in the embodiment corresponding to FIG. 3a. Details are not described herein again.

Figure 14:
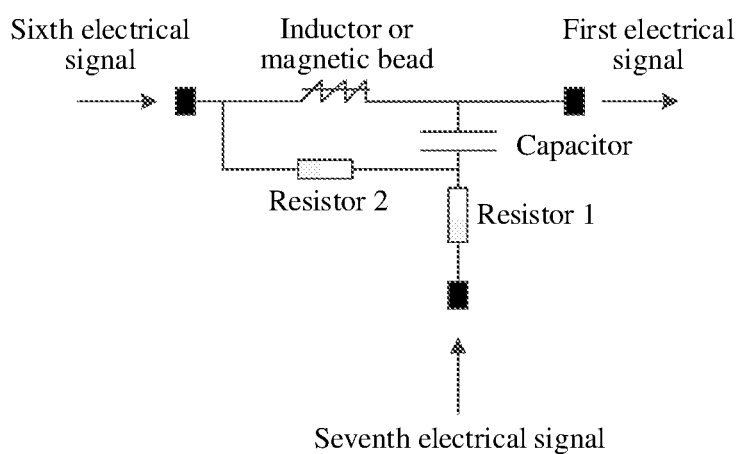
FIG. 14 is a schematic diagram of circuit implementation of a signal coupling apparatus according to an embodiment of this application.

The signal coupling apparatus may include a coupler, configured to couple the direct-current sixth electrical signal and the alternating-current seventh electrical signal, to obtain the first electrical signal. The signal coupling apparatus may be implemented in a plurality of different manners. FIG. 14 is an example. Refer to FIG. 14. FIG. 14 is a schematic diagram of circuit implementation of the signal coupling apparatus according to an embodiment of this application. As shown in FIG. 14, the direct-current sixth electrical signal may be coupled via an inductor or a magnetic bead, and the alternating-current seventh electrical signal may be coupled via a capacitor, to obtain a first electrical signal. A resistor 1 and a resistor 2 are optional components. Voltage division may be performed on the seventh electrical signal via the resistor 1 and the resistor 2, to reduce a signal amplitude of the finally obtained first electrical signal. In addition, connection to the sixth electrical signal via the resistor 2 may provide a drive current for coupling of the seventh electrical signal.

The optical receiving apparatus may include the optical receiving apparatus shown in any one of FIG. 3a to FIG. 3c, or include the optical receiving packaging apparatus shown in FIG. 13. For details, refer to the embodiment corresponding to FIG. 3a or FIG. 13. Details are not described herein again. The following describes a detailed implementation merely with reference to FIG. 15 as an example.

Figure 15:
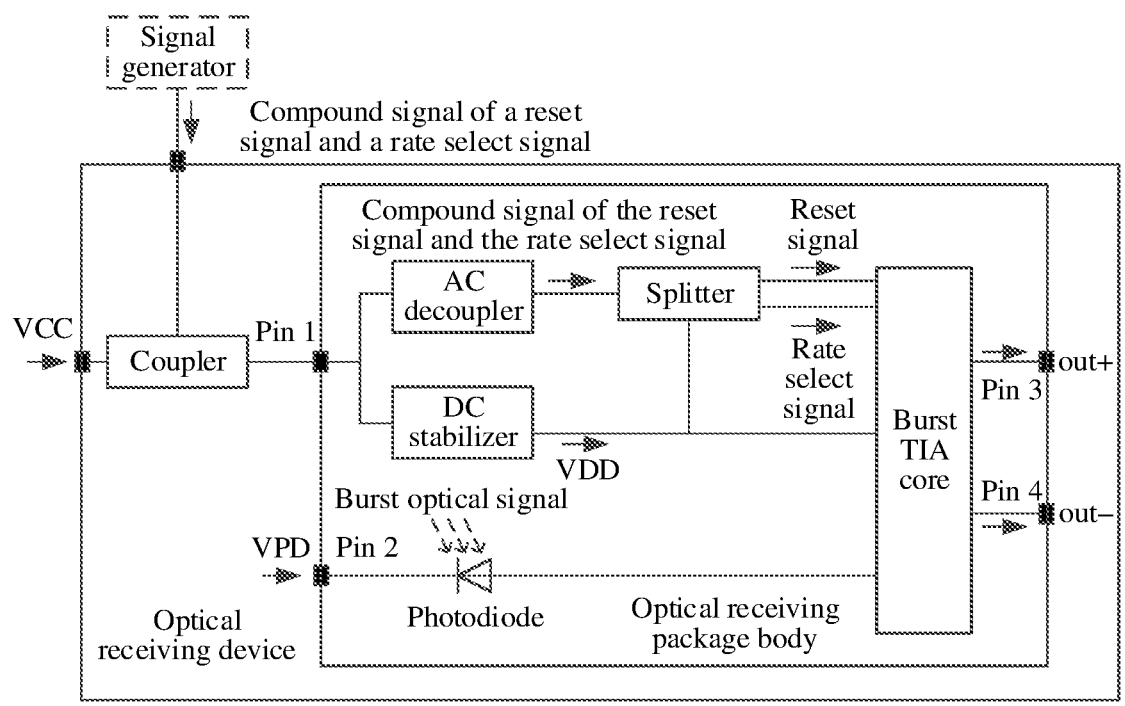
FIG. 15 is a schematic diagram of an optical receiving device according to an embodiment of this application.

Refer to FIG. 15. FIG. 15 is a schematic diagram of an optical receiving device according to an embodiment of this application. The optical receiving device includes a coupler and an optical receiving package body. The coupler may implement a function of the signal coupling apparatus, and the optical receiving package body may implement a function of the optical receiving apparatus. The optical receiving package body may include five signal pins: a pin 1, a pin 2, a pin 3, a pin 4, and a pin 5 (where the pin 5 is used for grounding, and is not shown in FIG. 15).

Further, an AC (alternating current) decoupler may implement a function of the decoupling module in the embodiment corresponding to FIG. 3a. A DC (direct current) stabilizer may implement a function of the voltage regulator module in the embodiment corresponding to FIG. 3a. A splitter may implement a function of the separation module in the embodiment corresponding to FIG. 3a. A burst TIA core (core) may implement a function of the amplifier module in the embodiment corresponding to FIG. 3a. The photodiode may implement a function of the optical-to-electrical conversion module in the embodiment corresponding to FIG. 3a.

In FIG. 15, a VCC signal is the foregoing sixth electrical signal. A compound signal of a reset signal and a rate select signal is the foregoing seventh electrical signal. The seventh electrical signal may be a pulse signal generated by a signal generator of another device.

The coupler may be configured to couple the VCC signal with the compound signal of the reset signal and the rate select signal. A first electrical signal obtained through coupling is transmitted to the optical receiving package body via the pin 1, and be separately transmitted to the AC decoupler and the DC stabilizer. The AC decoupler may be configured to decouple the compound signal (that is, the foregoing second electrical signal) of the reset signal and the rate select signal in the first electrical signal. The compound signal may be transmitted to the splitter. The splitter may be configured to extract the reset signal and the rate select signal separately, and transmit the reset signal and the rate select signal to the burst TIA core through two channels. The DC stabilizer may be configured to perform voltage regulation processing on the first electrical signal, and output a VDD (that is, the foregoing third electrical signal). The VDD may be separately transmitted to the splitter and the burst TIA core. The photodiode is configured to: under driving of a VPD (that is, the foregoing fifth electrical signal) input via the pin 2, detect a burst optical signal, and after detecting the burst optical signal, perform optical-to-electrical conversion on the burst optical signal to obtain a fourth electrical signal. The fourth electrical signal is transmitted to the burst TIA core. The burst TIA core may work under power supply of the VDD. The reset signal is used to control the burst TIA core to enter a burst signal receiving state. The rate select signal is used to control the burst TIA core to maintain or be adjusted to a signal receiving working mode corresponding to a corresponding receiving rate. Further, the burst TIA core may amplify the fourth electrical signal under the burst signal receiving state and the corresponding signal receiving working mode, and differentially output the amplified fourth electrical signal via the pin 3 and the pin 4. The amplified fourth electrical signal may be output to another apparatus or module outside the optical receiving package body in the optical receiving device, or may be output to another device in addition to the optical receiving device.

The optical receiving device shown in FIG. 15 couples the VCC signal, the compound signal of the reset signal, and the rate select signal into one signal via the coupler, and then transmits the signal into the optical receiving package body via the pin 1. This reduces a quantity of signal pins of the optical receiving package body. The coupled signal may be decoupled and separated inside the optical receiving package body via the AC decoupler, the DC stabilizer, and the splitter. The decoupled and separated signal may normally act on the burst TIA core, ensuring normal working of the burst TIA core.

An embodiment of this application further provides an optical signal processing method. The method may be applied to receive and process a burst optical signal. The method may include:

receiving a first electrical signal, and performing direct current removal processing on the first electrical signal to obtain a second electrical signal, where the first electrical signal carries control information, the second electrical signal is a pulse signal and carries the control information, and the control information is used to control a working state of the optical receiving apparatus; and performing voltage regulation processing on the first electrical signal to obtain a third electrical signal, where the third electrical signal is a signal with a constant amplitude;

receiving the burst optical signal and a fifth electrical signal, and converting the received burst optical signal into a fourth electrical signal based on the fifth electrical signal; and amplifying the fourth electrical signal based on the second electrical signal and the third electrical signal, and outputting the amplified fourth electrical signal.

The method may be applied to the optical receiving apparatus. In some embodiments, the optical receiving apparatus may be the optical receiving apparatus shown in any one of FIG. 3a to FIG. 3c or the optical receiving packaging apparatus shown in FIG. 13. For specific implementations and beneficial effects of each step, refer to specific implementations of each functional module in FIG. 3a or FIG. 13. Details are not described herein again.

An embodiment of this application further provides another optical signal processing method. The method may be applied to an optical communication device, where the optical communication device includes an optical receiving apparatus, and may include:

receiving a sixth electrical signal and a seventh electrical signal, and coupling the sixth electrical signal and the seventh electrical signal to obtain a first electrical signal, where the sixth electrical signal is used to supply power to the optical communication device, the seventh electrical signal carries control information, and the control information is used to control a working state of the optical receiving apparatus; and inputting the first electrical signal into the optical receiving apparatus, where the first electrical signal is used by the optical receiving apparatus to recover information in a burst optical signal.

For the sixth electrical signal and the seventh electrical signal, refer to corresponding descriptions of a same object in the foregoing embodiment. In addition, the optical receiving apparatus in the optical communication device may be the optical receiving apparatus shown in any one of FIG. 3a to FIG. 3c or the optical receiving packaging apparatus shown in FIG. 13. For a specific manner in which the optical receiving apparatus recovers information in the burst optical signal via the first electrical signal, refer to descriptions of the specific implementation in the embodiment corresponding to FIG. 3a or FIG. 13. Details are not described again.

An embodiment of this application provides a chip. The chip includes a processor and a communication interface. The processor is coupled to the communication interface for implementing all or some functions of the optical receiving apparatus shown in any one of FIG. 3a to FIG. 3c, all or some functions of the optical receiving packaging apparatus shown in FIG. 13, or the optical signal processing method provided in embodiments of this application.

In descriptions of embodiments of this application, unless otherwise specified, "/" represents "or". For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions in embodiments of this application, "a plurality of" means two or more than two.

In the specification, claims, and accompanying drawings of this application, the terms "first", "second", "third", "fourth", and the like are intended to distinguish between different objects but do not describe a specific order. In addition, the terms "including", "having", and any other variants thereof are intended to cover a non-exclusive inclusion. For example, a process, a method, a system, a product, or a device that includes a series of steps or units is not limited to the listed steps or units, but further includes an unlisted step or unit in some embodiments, or further includes another inherent step or unit of the process, the method, the product, or the device in some embodiments.

A person of ordinary skill in the art may understand that sequence numbers of the foregoing processes do not mean execution sequences in various embodiments of this application. The execution sequences of the processes should be determined based on functions and internal logic of the processes, and should not constitute any limitation on the implementation processes of embodiments of this application.

What is claimed is:

1. An optical receiving apparatus, configured to receive and process a burst optical signal, and the optical receiving apparatus comprising a decoupler, a voltage regulator, an optical-to-electrical converter, and an amplifier, wherein the decoupler is configured to receive a first electrical signal, and perform direct current removal processing on the first electrical signal thereby obtaining a second electrical signal, wherein the first electrical signal includes control information, the second electrical signal is a pulse signal and includes the control information, and the control information is useable to control a working state of the amplifier;

the voltage regulator is configured to receive the first electrical signal, and perform voltage regulation processing on the first electrical signal thereby obtaining a third electrical signal, wherein the third electrical signal has a constant amplitude and is useable to provide a voltage for the amplifier;

the optical-to-electrical converter is configured to receive the burst optical signal, and convert the burst optical signal into a fourth electrical signal; and the amplifier is configured to amplify the fourth electrical signal based on the control information in the second electrical signal and a power supply of the third electrical signal, and to output an amplified fourth electrical signal.

2. The apparatus according to claim 1, wherein the control information comprises at least one of reset information or rate selection information, the reset information is useable to control the amplifier to enter a burst signal receiving state, the amplifier comprises signal receiving working modes respectively corresponding to N different receiving rates, wherein N is a positive integer, and the rate selection information is useable to control the amplifier to be in a signal receiving working mode corresponding to a first receiving rate, wherein the first receiving rate is one of the N different receiving rates.

3. The apparatus according to claim 2, wherein the control information comprises the reset information and the rate selection information; and the apparatus further comprises a separator configured to separately extract the reset information and the rate selection information from the second electrical signal based on the power supply of the third electrical signal, and to separately transmit the reset information and the rate selection information to the amplifier based on the power supply of the third electrical signal.

4. The apparatus according to claim 3, wherein the separator is further configured to perform pulse detection on the second electrical signal thereby obtaining the reset information, perform peak detection on the second electrical signal, and obtain the rate selection information based on a detected signal peak.

5. The apparatus according to claim 3, wherein the separator is further configured to perform pulse detection on the second electrical signal thereby obtaining the reset information, perform peak duration detection on the second electrical signal, and obtain the rate selection information based on a detected peak duration.

6. The apparatus according to claim 3, wherein the separator is further configured to perform pulse detection on the second electrical signal, obtain a plurality of pieces of reset information based on a plurality of detected pulse signals, and obtain the rate selection information based on a quantity of pulses detected within a detection period.

7. The apparatus according to claim 3, wherein
the apparatus further comprises an extractor configured to extract the control information from the second electrical signal based on the power supply of the third electrical signal, and transmit the control information to the amplifier based on the power supply of the third electrical signal.

8. The apparatus according to claim 7, wherein the control information comprises the reset information, and the extractor is further configured to perform pulse detection on the second electrical signal thereby obtaining the reset information.

9. The apparatus according to claim 7, wherein the control information comprises the rate selection information, and the extractor is further configured to perform peak detection on the second electrical signal, and obtain the rate selection information based on a detected signal peak.

10. The apparatus according to claim 7, wherein the control information comprises the rate selection information, and the extractor is further configured to perform peak duration detection on the second electrical signal, and obtain the rate selection information based on a detected peak duration.

11. The apparatus according to claim 7, wherein the control information comprises the rate selection information, and the extractor is further configured to perform peak detection on the second electrical signal, and obtain the rate selection information based on a quantity of pulses detected within a detection period.

12. The apparatus according to claim 4, wherein the separator comprises a first pulse detector, a first peak detector, N first comparators, and a first logic operator;
the first pulse detector is configured to perform pulse detection on the second electrical signal, and output a pulse signal of one clock cycle in response to detecting the pulse signal, wherein the pulse signal output by the first pulse detector is useable to trigger the amplifier to enter the burst signal receiving state;
the first peak detector is configured to perform peak detection on the second electrical signal, and output a detected first peak signal;
each first comparator in the N first comparators is configured to compare a magnitude of a received first reference signal with a magnitude of the first peak signal, and output a first comparison result level, wherein each first reference signals received by the N first comparators is different; and the first logic operator is configured to perform a logic operation based on the first comparison result levels output by the corresponding N first comparators, and output rate indicator bit levels respectively corresponding to N receiving rates, wherein in the rate indicator bit levels respectively corresponding to the N receiving rates, a single rate indicator bit level corresponding to the first receiving rate is a first level, and the first level is useable to control the amplifier to be in the signal receiving working mode corresponding to the first receiving rate.

13. The apparatus according to claim 5, wherein the separator comprises a second pulse detector, a second peak detector, a second comparator, N signal delay circuits, N second logic operators, and a third logic operator;
the second pulse detector is configured to perform pulse detection on the second electrical signal, and output a pulse signal of one clock cycle in response to detecting the pulse signal, wherein the pulse signal output by the second pulse detector is useable to trigger the amplifier to enter the burst signal receiving state;
the second peak detector is configured to perform peak detection on the second electrical signal, and output a detected second peak signal, wherein a peak duration of the second peak signal is positively correlated with a pulse width of the second electrical signal;
the second comparator is configured to compare a magnitude of a received second reference signal with a magnitude of the second peak signal, and output a second comparison result level;
each delay circuit in the N signal delay circuits is configured to delay the second comparison result level thereby obtaining a first delay signal, and a delay duration of the N signal delays for the second comparison result level is different;
one signal delay circuit of the N signal delay circuits is connected to one second logic operator, and the second logic operator is configured to perform a logic AND operation on the received first delay signal and the second comparison result level thereby obtaining an operation result indication level; and
the third logic operator is configured to perform a logic operation based on the operation result indication levels output by the corresponding N second logic operators, and output rate indicator bit levels respectively corresponding to N receiving rates, wherein in the rate indicator bit levels respectively corresponding to the N receiving rates, a single rate indicator bit level corresponding to the first receiving rate is a second level, and the second level is useable to control the amplifier to be in the signal receiving working mode corresponding to the first receiving rate.

14. The apparatus according to claim 6, wherein the separator comprises a third pulse detector and a polling triggerer;
the third pulse detector is configured to perform pulse detection on the second electrical signal, and output a pulse signal of one clock cycle in response to detecting the pulse signal, wherein the pulse signal output by the third pulse detector is useable to trigger the amplifier to enter the burst signal receiving state; and
the polling triggerer is configured to detect the pulse signal within the detection periodicity, under triggering of at least one pulse signal detected within the detection periodicity, determine the first receiving rate from N receiving rates based on a first rate polling sequence, and set a rate indicator bit level corresponding to the first receiving rate to a third level; and the polling triggerer is further configured to output rate indicator bit levels respectively corresponding to the N receiving rates, wherein in the rate indicator bit levels respectively corresponding to the N receiving rates, a single rate indicator bit level corresponding to the first receiving rate is the third level, and the third level is useable to control the amplifier to be in the signal receiving working mode corresponding to the first receiving rate.

15. An optical receiving packaging apparatus, comprising five signal pins, a photoelectric detector, and a trans-impedance amplifier;
the five signal pins comprise a first signal pin, a second signal pin, a third signal pin, a fourth signal pin, and a fifth signal pin;
the first signal pin is useable for inputting a first electrical signal, wherein the first electrical signal includes control information, and the control information is useable to control a working state of the trans-impedance amplifier;
the second signal pin is useable for inputting a fifth electrical signal, wherein the fifth signal pin is useable for grounding;
the photoelectric detector is configured to convert a received burst optical signal into a fourth electrical signal based on a power supply of the fifth electrical signal;
the trans-impedance amplifier is configured to receive the first electrical signal, and to perform direct current filtering on the first electrical signal thereby obtaining a second electrical signal, perform voltage regulation processing on the first electrical signal thereby obtaining a third electrical signal, wherein the second electrical signal includes the control information, and amplify the fourth electrical signal based on the control information in the second electrical signal and a power supply of the third electrical signal, thereby obtaining the amplified fourth electrical signal; and
the third signal pin and the fourth signal pin are useable for differentially outputting the fourth electrical signal amplified by the trans-impedance amplifier.

16. The optical receiving packaging apparatus according to claim 15, wherein the control information comprises at least one of reset information or rate selection information, the reset information is useable to control the trans-impedance amplifier to enter a burst signal receiving state, the trans-impedance amplifier comprises signal receiving working modes respectively corresponding to N different receiving rates, wherein N is a positive integer, and the rate selection information is useable to control the trans-impedance amplifier to be in a signal receiving working mode corresponding to a first receiving rate, wherein the first receiving rate is one of the N different receiving rates.

17. An optical receiving device, comprising the optical receiving apparatus according to claim 1, and a signal coupling apparatus, wherein
the signal coupling apparatus is configured to receive a sixth electrical signal and a seventh electrical signal, couple the sixth electrical signal and the seventh electrical signal, and output a first electrical signal, wherein the sixth electrical signal is useable to supply power to the optical receiving device, the seventh electrical signal includes control information, and the control information is useable to control a working state of the optical receiving apparatus; and
the optical receiving apparatus is configured to receive the first electrical signal, perform direct current removal processing on the first electrical signal thereby obtaining a second electrical signal, and perform voltage regulation processing on the first electrical signal thereby obtaining a third electrical signal; the optical receiving apparatus is further configured to receive a burst optical signal and a fifth electrical signal, based on a power supply of the fifth electrical signal, convert the received burst optical signal into a fourth electrical signal, and amplify and output the fourth electrical signal based on the second electrical signal and a power supply of the third electrical signal.

18. An optical signal processing method, comprising:
receiving a first electrical signal, and performing direct current removal processing on the first electrical signal thereby obtaining a second electrical signal, wherein the first electrical signal includes control information, the second electrical signal is a burst signal and includes the control information, and the control information is useable to control a working state of an optical receiving apparatus;
performing voltage regulation processing on the first electrical signal thereby obtaining a third electrical signal, wherein the third electrical signal has a constant amplitude;
receiving the burst optical signal and a fifth electrical signal and converting the received burst optical signal into a fourth electrical signal based on the fifth electrical signal; and
amplifying the fourth electrical signal based on the second electrical signal and the third electrical signal and outputting the amplified fourth electrical signal.

19. The optical signal processing method according to claim 18, further, comprising:
receiving a sixth electrical signal and a seventh electrical signal, and coupling the sixth electrical signal and the seventh electrical signal thereby obtaining a first electrical signal, wherein the sixth electrical signal is useable to supply power to an optical communication device, the seventh electrical signal includes control information, and the control information is useable to control a working state of an optical receiving apparatus; and
inputting the first electrical signal into the optical receiving apparatus, wherein the first electrical signal is useable by the optical receiving apparatus to perform the optical signal processing method.

* * * * *